(12) United States Patent  (10) Patent No.: US 8,203,251 B2
Ishizuka et al.  (45) Date of Patent: Jun. 19, 2012

(54) STATOR WITH RESTRAINTS FOR RESTRAINING RELATIVE RADIAL MOVEMENT BETWEEN TURN PORTIONS OF ELECTRIC WIRES

(75) Inventors: Atsuo Ishizuka, Nagoya (JP); Shinji Kouda, Kariya (JP)

(73) Assignee: Denso Corporation, Kariya (JP)

( * ) Notice: Subject to any disclaimer, the term of this patent is extended or adjusted under 35 U.S.C. 154(b) by 266 days.

(21) Appl. No.: 12/768,100

(22) Filed: Apr. 27, 2010

(65) Prior Publication Data
US 2010/0270887 A1 Oct. 28, 2010

(30) Foreign Application Priority Data
Apr. 27, 2009 (JP) .................................. 2009-108155

(51) Int. Cl.
*H02K 3/46* (2006.01)
(52) U.S. Cl. ...................... 310/260; 310/270; 310/254.1
(58) Field of Classification Search .................. 310/260, 310/270, 254.1, 216.114, 208
See application file for complete search history.

(56) References Cited

U.S. PATENT DOCUMENTS

| | | | | |
|---|---|---|---|---|
| 3,388,458 A | * | 6/1968 | Logan ............................. | 29/596 |
| 3,436,580 A | * | 4/1969 | Brennan et al. ............... | 310/260 |
| 3,662,195 A | * | 5/1972 | Wielt ............................. | 376/163 |
| 6,972,507 B1 | * | 12/2005 | Kaminiski et al. ............. | 310/270 |
| 7,086,137 B2 | * | 8/2006 | Tornquist et al. .............. | 29/598 |
| 7,432,628 B2 | * | 10/2008 | Miyatake et al. ............. | 310/270 |
| 2005/0258708 A1 | * | 11/2005 | Kaminiski et al. ............ | 310/270 |
| 2009/0212654 A1 | | 8/2009 | Kaneiwa | |
| 2009/0218905 A1 | | 9/2009 | Kaneiwa et al. | |

FOREIGN PATENT DOCUMENTS

| | | |
|---|---|---|
| JP | 2000-166158 | 6/2000 |
| JP | 2006-033918 | 2/2006 |
| JP | 2009-207255 | 9/2009 |
| JP | 2009-207334 | 9/2009 |

* cited by examiner

*Primary Examiner* — Thanh Lam
(74) *Attorney, Agent, or Firm* — Nixon & Vanderhye PC

(57) ABSTRACT

A stator includes a stator core, a stator coil comprised of a plurality of electric wires, and at least one restraint. Each of the electric wires has a plurality of in-slot portions received in slots of the stator core and a plurality of turn portions that are located outside of the slots to connect the in-slot portions. The restraint is mounted to end parts of the turn portions belonging to a turn portion group of the electric wires to restrain relative radial movement between the turn portions of the turn portion group. All the turn portions of the turn portion group protrude from the same slot of the stator core. The end parts of the turn portions respectively adjoin the in-slot portions of the electric wires received in the same slot of the stator core and align with each other in a radial direction of the stator core.

31 Claims, 25 Drawing Sheets

STATOR WITH RESTRAINTS FOR RESTRAINING RELATIVE RADIAL MOVEMENT BETWEEN TURN PORTIONS OF ELECTRIC WIRES

CROSS-REFERENCE TO RELATED APPLICATION

This application is based on and claims priority from Japanese Patent Application No. 2009-108155, filed on Apr. 27, 2009, the content of which is hereby incorporated by reference in its entirety into this application.

BACKGROUND OF THE INVENTION

1. Technical Field of the Invention

The present invention relates generally to stators for electric rotating machines that are used in, for example, motor vehicles as electric motors and electric generators.

More particularly, the invention relates to a stator for an electric rotating machine which includes restraints for restraining relative radial movement between turn portions of electric wires; the electric wires make up a stator coil of the stator, with the turn portions located outside of slots of a stator core of the stator to form coil ends of the stator coil.

2. Description of the Related Art

In recent years, electric rotating machines, such as electric motors and electric generators, have been required to be compact, be able to output high power, and have high quality.

In particular, for electric rotating machines for use in motor vehicles, the spaces available for installation of those machines in the motor vehicles have been decreasing, while the need for them to output high power has been increasing. Moreover, it has also been required to improve the reliability of those electric rotating machines.

Japanese Unexamined Patent Application Publication No. 2000-166158 discloses a winding method for reducing stresses on insulating paper sheets interposed between a stator coil and a stator core of a stator for an electric rotating machine. More specifically, according to the winding method, spacers are first mounted on the axial end faces of the stator core which has the insulating paper sheets arranged in slots thereof. Then, the stator coil is wound around the stator core so that the insulating paper sheets are interposed between the stator core and the stator coil and the spacers are interposed between the axial end faces of the stator core and the stator coil. Thereafter, the spacers are removed from the stator core and the stator coil which together constitute the stator for the electric rotating machine. Consequently, with the use of the spacers, it is possible to reduce stresses which are imposed on the insulating paper sheets during the winding of the stator coil, thereby ensuring the insulation properties of the insulating paper sheets and improving the reliability of the electric rotating machine.

Japanese Unexamined Patent Application Publication No. 2006-33918 discloses a stator for an electric rotating machine which includes field-relaxing blocks. More specifically, the field-relaxing blocks are made of a metal or resin and have a circular or triangular cross-section. The field-relaxing-blocks are mounted on the axial end faces of teeth of a stator core of the stator, thereby preventing electric field from concentrating on the axial end of the stator core.

However, neither the spacers disclosed in Japanese Unexamined Patent Application Publication No. 2000-166158 nor the field-relaxing blocks disclosed in Japanese Unexamined Patent Application Publication No. 2006-33918 can restrain relative radial movement between turn portions of electric wires that make up the stator coil. More specifically, each of the electric wires has a plurality of in-slot portions, each of which is received in a corresponding one of the slots of the stator core, and a plurality of turn portions each of which is located outside of the slots of the stator core to connect one adjacent pair of the in-slot portions of the electric wire.

Without restraining relative radial movement between the turn portions of the electric wires, during operation of the electric rotating machine, the turn portions may spread radially (i.e., in the radial direction of the stator core) due to vibration and/or thermal and mechanical stresses imposed thereon, causing the in-slot portions of the electric wires to radially spread as well. Consequently, the stator coil may protrude radially inward from the stator core to make contact with a rotor which is disposed radially inside of the stator core to constitute, together with the stator, the electric rotating machine. As a result, either or both of the stator coil and the rotor would be damaged, thereby lowering the reliability of the electric rotating machine.

SUMMARY OF THE INVENTION

According to one aspect of the present invention, there is provided a stator for an electric rotating machine. The stator includes a hollow cylindrical stator core, a stator coil, and at least one restraint. The stator core has a plurality of slots that are formed in a radially inner surface of the stator core and spaced at predetermined intervals in a circumferential direction of the stator core. The stator coil is comprised of a plurality of electric wires mounted on the stator core. Each of the electric wires has a plurality of in-slot portions, each of which is received in a corresponding one of the slots of the stator core, and a plurality of turn portions each of which is located outside of the slots of the stator core to connect one adjacent pair of the in-slot portions of the electric wire. The restraint is mounted to end parts of the turn portions belonging to a turn portion group of the electric wires to restrain relative radial movement between the turn portions of the turn portion group. All of the turn portions of the turn portion group protrude from the same one of the slots of the stator core. The end parts of the turn portions of the turn portion group respectively adjoin the in-slot portions of the electric wires received in the same slot of the stator core and align with each other in a radial direction of the stator core.

Consequently, with the restraint, it is possible to prevent the turn portions of the turn portion group of the electric wires from spreading in the radial direction of the stator core during operation of the electric rotating machine.

According to another aspect of the present invention, there is provided an electric rotating machine which includes a rotating shaft, a rotor fixed on the rotating shaft, and a stator surrounding the rotor. The stator includes a hollow cylindrical stator core, a stator coil, and at least one restraint. The stator core has a plurality of slots that are formed in a radially inner surface of the stator core and spaced at predetermined intervals in a circumferential direction of the stator core. The stator coil is comprised of a plurality of electric wires mounted on the stator core. Each of the electric wires has a plurality of in-slot portions, each of which is received in a corresponding one of the slots of the stator core, and a plurality of turn portions each of which is located outside of the slots of the stator core to connect one adjacent pair of the in-slot portions of the electric wire. The restraint is mounted to end parts of the turn portions belonging to a turn portion group of the electric wires to restrain relative radial movement between the turn portions of the turn portion group. All of the turn portions of the turn portion group protrude from the same one of the slots of the stator core. The end parts of the turn portions of the turn portion group respectively adjoin the in-slot portions of the electric wires received in the same slot of the stator core and align with each other in a radial direction of the stator core.

Consequently, with the restraint, it is possible to prevent the turn portions of the turn portion group of the electric wires from spreading in the radial direction of the stator core during operation of the electric rotating machine. Thus, it is possible to prevent the stator coil from protruding radially inward from the slots of the stator core to make contact with the rotor of the electric rotating machine. As a result, it is possible to protect both the stator coil and the rotor, thereby ensuring reliability of the electric rotating machine.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Figure 1:
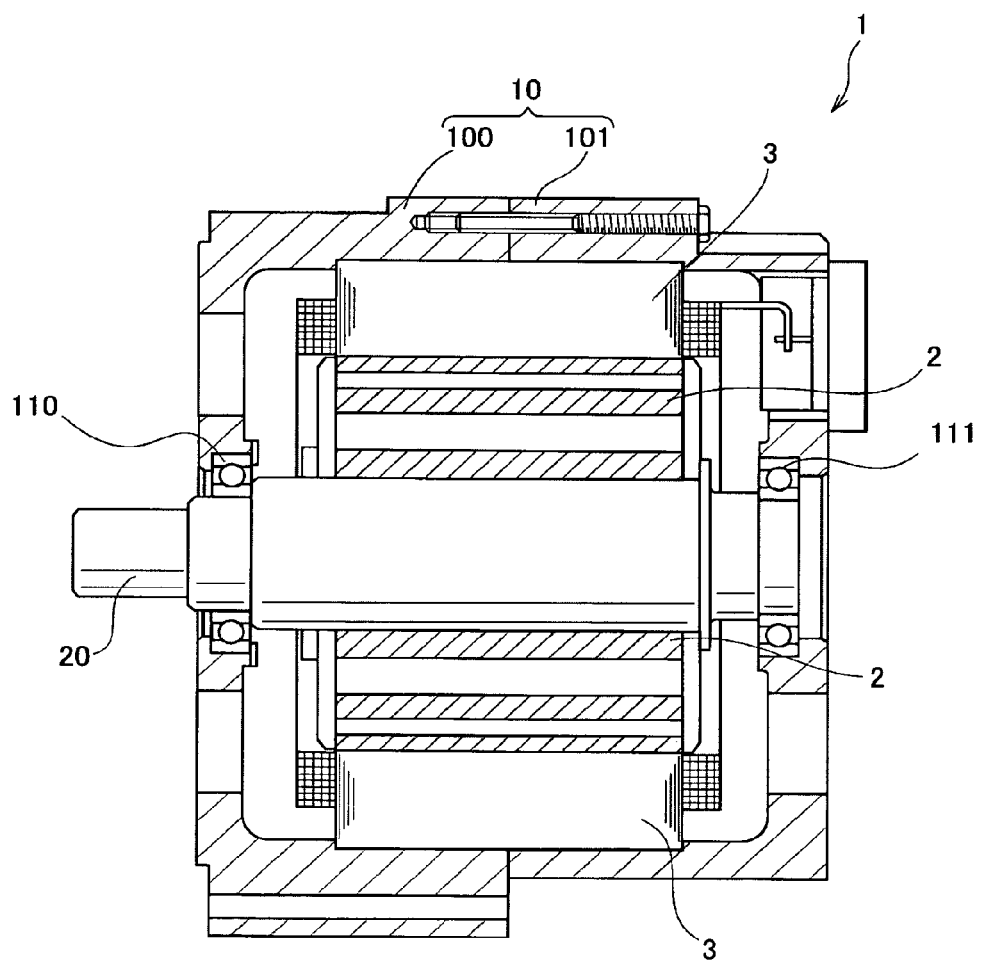
FIG. 1 is a schematic cross-sectional view illustrating the overall configuration of an electric rotating machine which includes a stator according to the first embodiment of the invention.

Preferred embodiments of the present invention and modifications thereof will be described hereinafter with reference to FIGS. 1-33. It should be noted that, for the sake of clarity and understanding, identical components having identical functions in different embodiments and modifications have been marked, where possible, with the same reference numerals in each of the figures.

First Embodiment

FIG. 1 shows the overall configuration of an electric rotating machine 1 which includes a stator 3 according to the first embodiment of the invention.

The electric rotating machine 1 is for use in a motor vehicle, such as en electric vehicle or a hybrid vehicle, and can function both as an electric motor and as an electric generator.

As shown in FIG. 1, the electric rotating machine 1 further includes a housing 10 and a rotor 2 in addition to the stator 3. The housing 10 is composed of a pair of cup-shaped housing pieces 100 and 101 which are jointed together at the open ends thereof. The housing 10 has a pair of bearings 110 and 111 mounted therein, via which a rotating shaft 20 is rotatably supported by the housing 10. The rotor 2 is received in the housing 10 and fixed on the rotating shaft 20. The stator 3 is fixed in the housing 10 so as to surround the radially outer periphery of the rotor 2.

The rotor 2 includes a plurality of permanent magnets that form a plurality of magnetic poles on the radially outer periphery of the rotor 2 to face the radially inner periphery of the stator 3. The polarities of the magnetic poles alternate between north and south in the circumferential direction of the rotor 2. The number of the magnetic poles is set according to the design specification of the electric rotating machine 1. In the present embodiment, the number of the magnetic poles is set to be equal to, for example, eight (i.e., four north poles and four south poles).

The stator 3 includes a hollow cylindrical stator core 30, a three-phase stator coil 4 mounted on the stator core 30, and a plurality of restraints 5 interposed between the stator core 30 and the stator coil 4.

Figure 2:
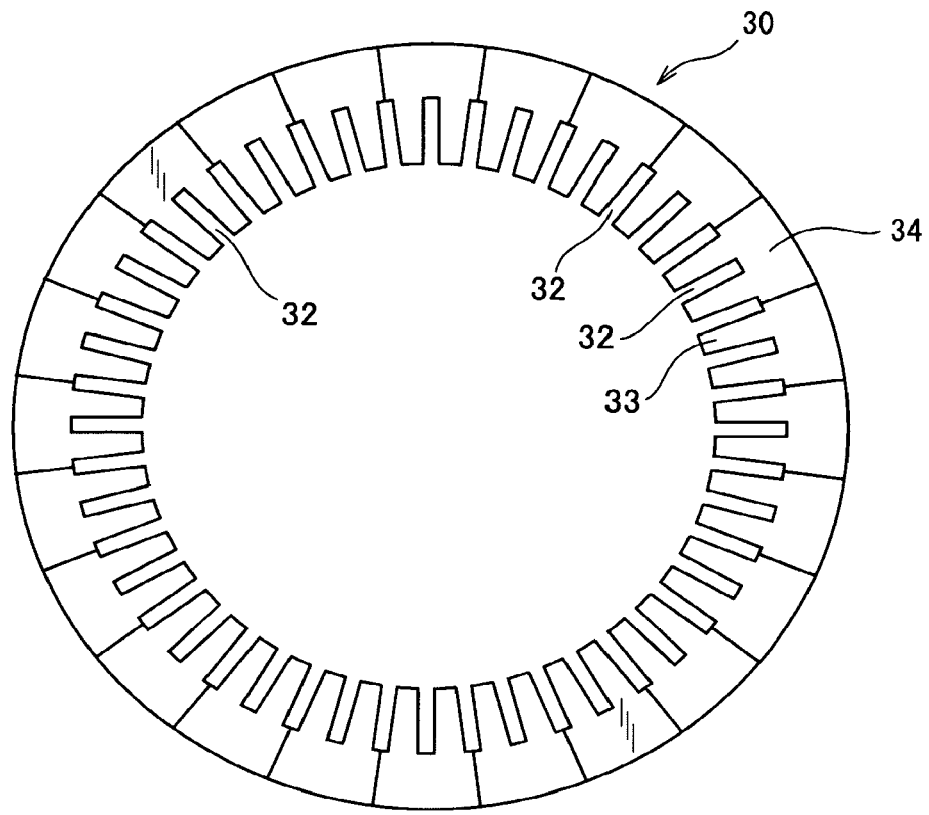
FIG. 2 is a schematic end view of a stator core of the stator.

The stator core 30 has, as shown in FIG. 2, a plurality of slots 32 that are formed in the radially inner surface of the stator core 30 and spaced in the circumferential direction of the stator core 30 at predetermined intervals. For each of the slots 32, the depth-wise direction of the slot 32 is coincident with the radial direction of the stator core 30. In the present embodiment, with respect to each of the eight magnetic poles of the rotor 2, there are provided two slots 32 for each of the three phases of the stator coil 4. Accordingly, the total number of the slots 32 provided in the stator core 30 is equal to 48 (i.e., 8×3×2).

The stator core 30 also has a plurality of tooth portions 33 and a back core portion 34. Each of the tooth portions 33 radially extends between a circumferentially-adjacent pair of the slots 32. The back core portion 34 is located radially outward of the tooth portions 33 to connect them.

Figure 3:
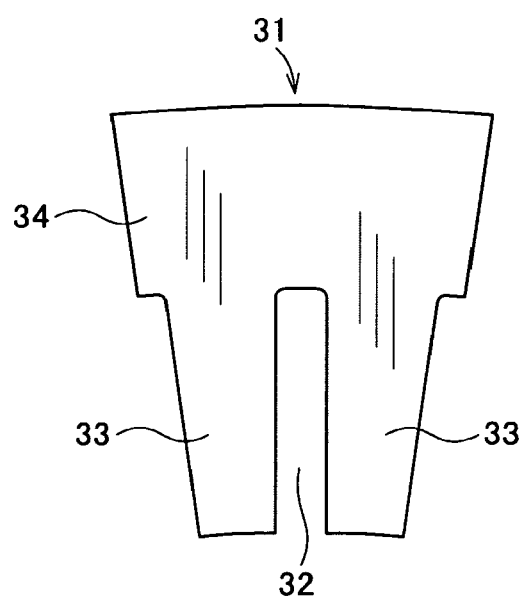
FIG. 3 is a schematic end view of one of stator core segments which make up the stator core.

Moreover, in the present embodiment, the stator core 30 is comprised of, for example, 24 stator core segments 31 that are arranged in the circumferential direction of the stator core 30 to adjoin one another. Referring to FIG. 3 together with FIG. 2, each of the stator core segments 31 defines therein one of the slots 32 of the stator core 30. Further, each circumferentially-adjoining pair of the stator core segments 31 together defines one of the slots 32 therebetween. Furthermore, each of the stator core segments 31 defines therein two of the tooth portions 33 of the stator core 30 and one segment of the back core portion 34 of the stator core 30.

In addition, in the present embodiment, each of the stator core segments 31 is formed by laminating a plurality of (e.g., 410) magnetic steel sheets with a plurality of insulting films interposed therebetween. Each of the magnetic steel sheets has a thickness of, for example, 0.3 mm. It should be noted that other conventional metal sheets may also be used instead of the magnetic steel sheets.

The three-phase stator coil 4 is comprised of a plurality of (e.g., twelve in the present embodiment) wave-shaped electric wires 40 wound around the stator core 30.

Figure 4A:
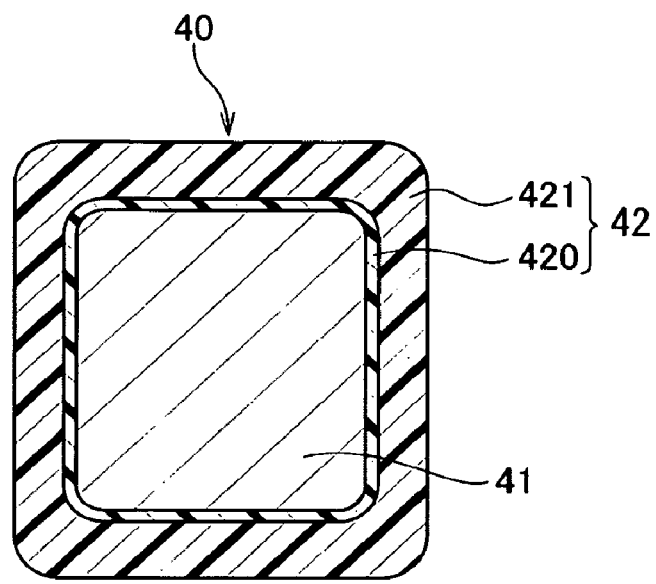
FIG. 4A is a schematic cross-sectional view illustrating the configuration of electric wires forming a stator coil of the stator.

As shown in FIG. 4A, each of the electric wires 40 is comprised of an electric conductor 41 and an insulating coat 42 that covers the outer surface of the electric conductor 41.

The electric conductor 41 is made of, for example, copper and has a substantially rectangular cross section. In addition, with the rectangular cross section, it is possible to mount the electric wires 40 on the stator core 30 at high density.

The insulating coat 42 is two-layer structured to include an inner layer 420 and an outer layer 421. The thickness of the insulating coat 42 (i.e., the sum of thicknesses of the inner and outer layers 420 and 421) is set to be in the range of 100 to 200 µm. In addition, with such a large thickness of the insulating coat 42, it is possible to reliably insulate the electric wires 40 from one another without interposing insulating paper sheets therebetween. However, it should be appreciated that insulating paper sheets may also be interposed between the electric wires 40 to further enhance the electrical insulation therebetween.

Further, the outer layer 421 is made of an insulating material such as nylon. The inner layer 420 is made of an insulating material having a higher glass transition temperature than the outer layer 421, such as a thermoplastic resin or a polyamide-imide resin. Consequently, the outer layers 421 of the electric wires 40 will be softened by the heat generated by operation of the electric rotating machine 1 earlier than the inner layers 420, thereby bonding together those portions of the electric wires 40 which are received in the same ones of the slots 32 of the stator core 30. As a result, those portions of the electric wires 40 will be integrated into a rigid body, thereby enhancing the mechanical strength thereof. In addition, for each of the electric wires 40, when excessive vibration occurs, the outer layer 421 will be first separated from the inner layer 420, leaving the inner layer 420 to keep covering the outer surface of the electric conductor 41. As a result, the electrical insulation between the electric wires 40 can be maintained.

Figure 4B:
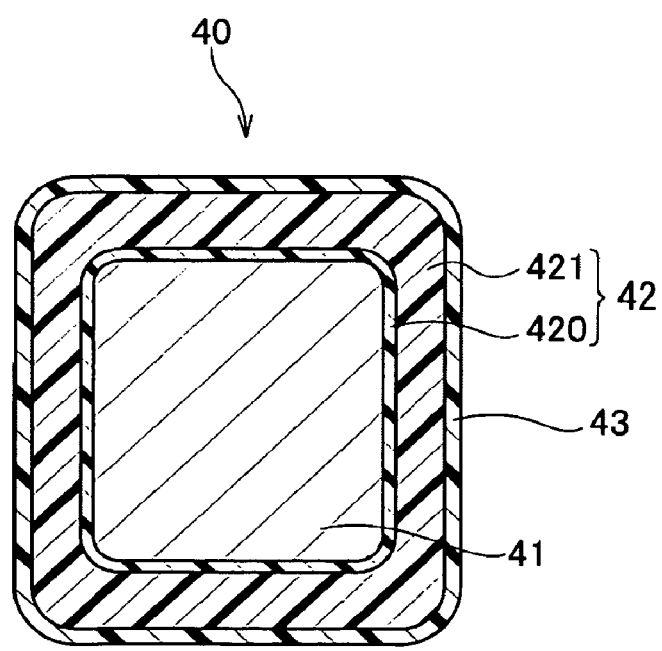
FIG. 4B is a schematic cross-sectional view illustrating a modification of the configuration of the electric wires shown in FIG. 4A.

Furthermore, as shown in FIG. 4B, it is also possible for each of the electric wires 40 to further include a fusible coat 43 to cover the outer surface of the insulating coat 42. The fusible coat 43 may be made, for example, of epoxy resin. In this case, the fusible coats 43 of the electric wires 40 will be fused by the heat generated by operation of the electric rotating machine 1 earlier than the insulating coats 42, thereby bonding together those portions of the electric wires 40 which are received in the same ones of the slots 32 of the stator core 30. As a result, those portions of the electric wires 40 will be integrated into a rigid body, thereby enhancing the mechanical strength thereof. In addition, in this case, the outer layers 421 of the insulating coats 42 of the electric wires 40 may also be made of PPS (polyphenylene sulfide).

Figure 5:
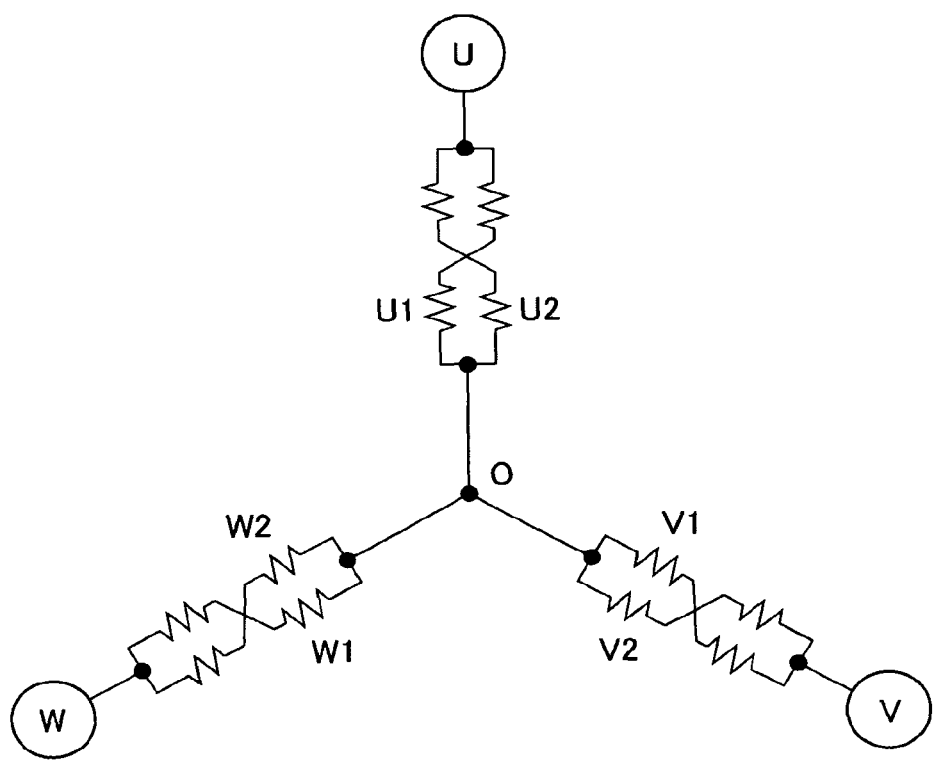
FIG. 5 is a schematic circuit diagram of the stator.

Referring to FIG. 5, in the present embodiment, the stator coil 4 includes six phase windings U1, U2, V1, V2, W1, and W2. The phase windings U1 and U2 are connected in parallel with each other to make up a U-phase winding of the stator coil 4. Similarly, the phase windings V1 and V2 are connected in parallel with each other to make up a V-phase winding of the stator coil 4. The phase windings W1 and W2 are connected in parallel with each other to make up a W-phase winding of the stator coil 4. Further, the U-phase, V-phase, and W-phase windings are Y-connected to have a neutral point O therebetween.

Moreover, in the present embodiment, each of the six phase windings U1, U2, V1, V2, W1, and W2 of the stator coil 4 is formed by joining a pair of the electric wires 40 by, for example, welding. In other words, each of the six phase windings U1, U2, V1, V2, W1, and W2 is comprised of two of the twelve electric wires 40.

Figure 6:
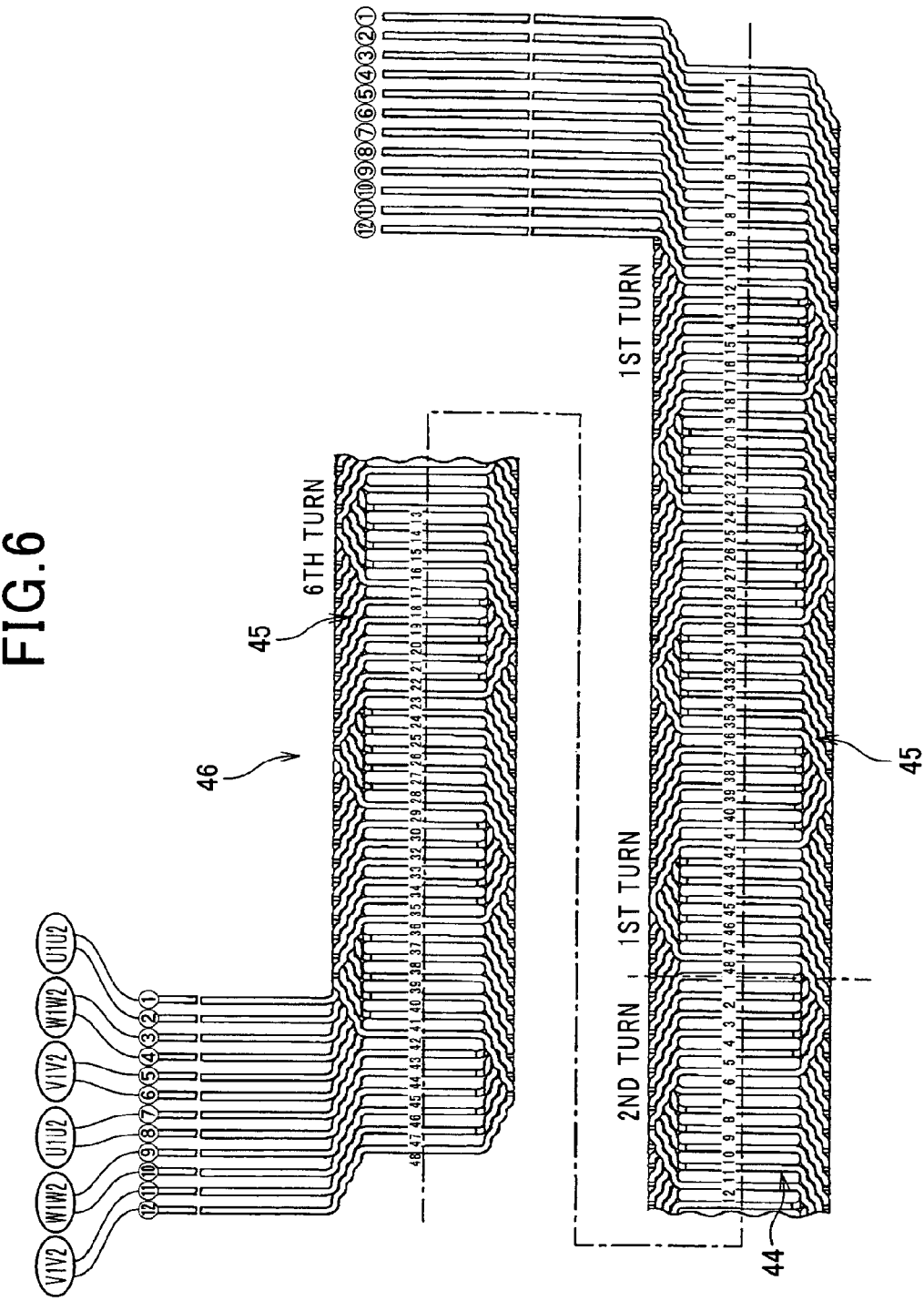
FIG. 6 is a plan view of an electric wire assembly for forming the stator coil.
Figure 7:
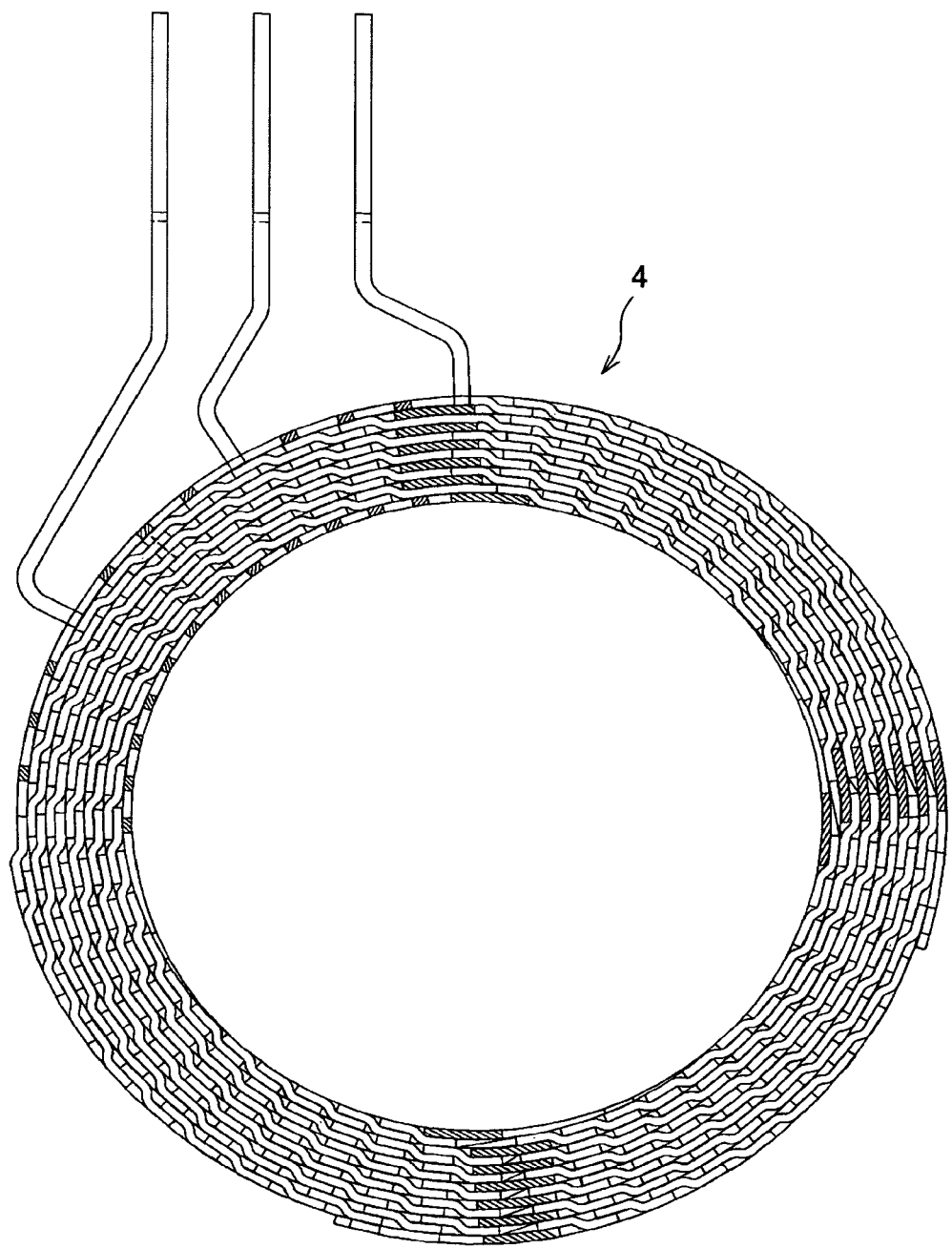
FIG. 7 is an end view of the stator coil that is obtained by rolling the electric wire assembly.

In the present embodiment, the stator coil 4 is made by stacking the twelve wave-shaped electric wires 40 to form a flat band-shaped electric wire assembly 46 as shown in FIG. 6 and rolling the electric wire assembly 46 by a predetermined number of turns (e.g., six turns) into a hollow cylindrical shape as shown in FIG. 7. In addition, in FIG. 6, the twelve wave-shaped electric wires 40 are numbered with circled numbers 1-12.

Referring to FIG. 6, each of the twelve electric wires 40 is wave-shaped to include a plurality of in-slot portions 44 and a plurality of turn portions 45.

The in-slot portions 44 extend straight in parallel with each other and are equally spaced at predetermined intervals. After assembling the stator core 30 to the stator coil 4, each of the in-slot portions 44 is received in a corresponding one of the slots 32 of the stator core 30.

Each of the turn portions 45 extends to connect one adjacent-pair of the in-slot portions 44. After assembling the stator core 30 to the stator coil 4, each of the turn portions 45 is located outside of the slots 32 of the stator core 30.

In the stator 3, each of the twelve electric wires 40 is wave-wound around the stator core 30 so as to extend in the circumferential direction of the stator core 30. In the present embodiment, the slots 32 of the stator core 30 are divided into eight groups each of which includes six circumferentially-adjacent slots 32. For each of the electric wires 40, all of the in-slot portions 44 of the electric wire 40 are received in eight slots 32 that belong respectively to the eight groups and are spaced six slots 32 apart in the circumferential direction of the stator core 30. Further, for each of the electric wires 40, each of the turn portions 45 of the electric wire 40 protrudes from one of the axial end faces of the stator core 30 to connect one circumferentially-adjacent pair of the in-slot portions 44 of the electric wire 40. Consequently, all of the turn portions 45 of the electric wires 40 are located outside of the slots 32 of the stator core 30 to make up coil ends of the stator coil 4.

In addition, in each of the slots 32 of the stator core 30, there are aligned twelve of the in-slot portions 44 of the electric wires 40 in the depth-wise direction of the slot 32 (i.e., in the radial direction of the stator core 30). In other words, the number of the in-slot portions 44 of the electric wires 40 received in each of the slots 32 of the stator core 30 is equal to 12.

Next, the configuration of the restraints 5 according to the present embodiment will be described in detail.

Figure 8:
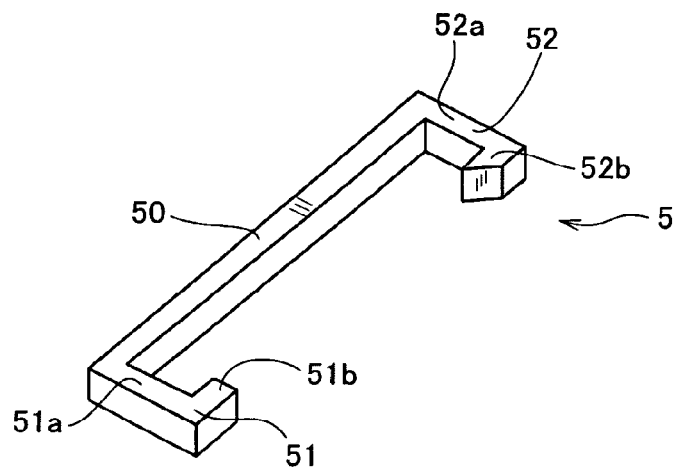
FIG. 8 is a perspective view of a restraint according to the first embodiment.

As shown in FIG. 8, each of the restraints 5 has a connecting portion 50 and first and second restraining portions 51 and 52 that are connected by the connecting portion 50. In addition, in the present embodiment, each of the restraints 5 is made of an electrically-insulative thermosetting resin, and more particularly of a phenol resin.

Figure 9:
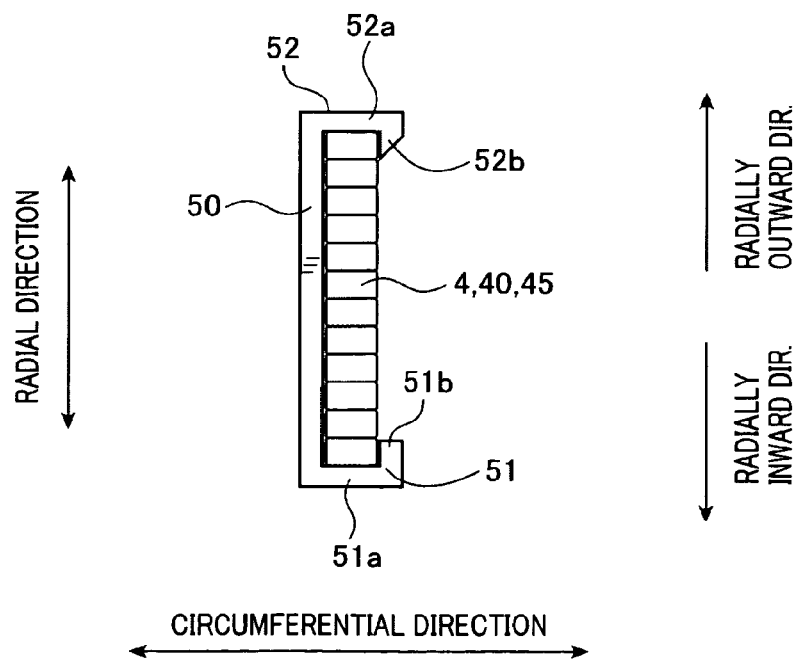
FIG. 9 is a schematic side view illustrating the restraint after being mounted to the turn portions of a corresponding turn portion group of the electric wires which make up the stator coil.

The connecting portion 50 has the shape of a bar with a rectangular cross section. After assembly of the stator 3, as illustrated in FIG. 9, the connecting portion 50 extends in the radial direction of the stator core 30. In addition, in the present embodiment, the width of the connecting portion 50 is smaller than that of the tooth portions 33 of the stator core 30 at the radially inner periphery of the stator core 30.

The first restraining portion 51 is substantially L-shaped to include a base part 61a and a tip part 51b. The base part 51a is connected to one longitudinal end of the connecting portion 50 and extends perpendicular to the connecting portion 50. The tip part 51b is connected to the base part 51a and extends parallel to the connecting portion 50 (i.e., perpendicular to the base part 51a). After assembly of the stator 3, as illustrated in FIG. 9, between the tip part 51b and the connecting portion 50, there is fitted the radially-inmost turn portion 45 of a corresponding turn portion group of the electric wires 40. The corresponding turn portion group includes twelve turn portions 45 of the electric wires 40 which protrude from the same slot 32 of the stator core 30.

The second restraining portion 52 is also substantially L-shaped to include a base part 52a and a tip part 52b. The base part 52a is connected to the other longitudinal end of the connecting portion 50 and extends perpendicular to the connecting portion 50. The tip part 52b is connected to the base part 52a and extends parallel to the connecting portion 50 (i.e., perpendicular to the base part 52a). After assembly of the stator 3, as illustrated in FIG. 9, between the tip part 52b and the connecting portion 50, there is fitted the radially-outmost turn portion 45 of the corresponding turn portion group of the electric wires 40. Moreover, in the present embodiment, the tip part 52b is tapered radially inward with one side surface thereof on the opposite side to the connecting portion 50 extending obliquely with respect to the connecting portion 50.

Furthermore, as illustrated in FIG. 9, the base parts 51a and 52a of the first and second restraining portions 51 and 52 respectively abut the radially-inmost and radially-outmost turn portions 45 of the corresponding turn portion group of the electric wires 40, thereby restraining relative radial movement between the turn portions 40 of the corresponding turn portion group.

Figure 10:
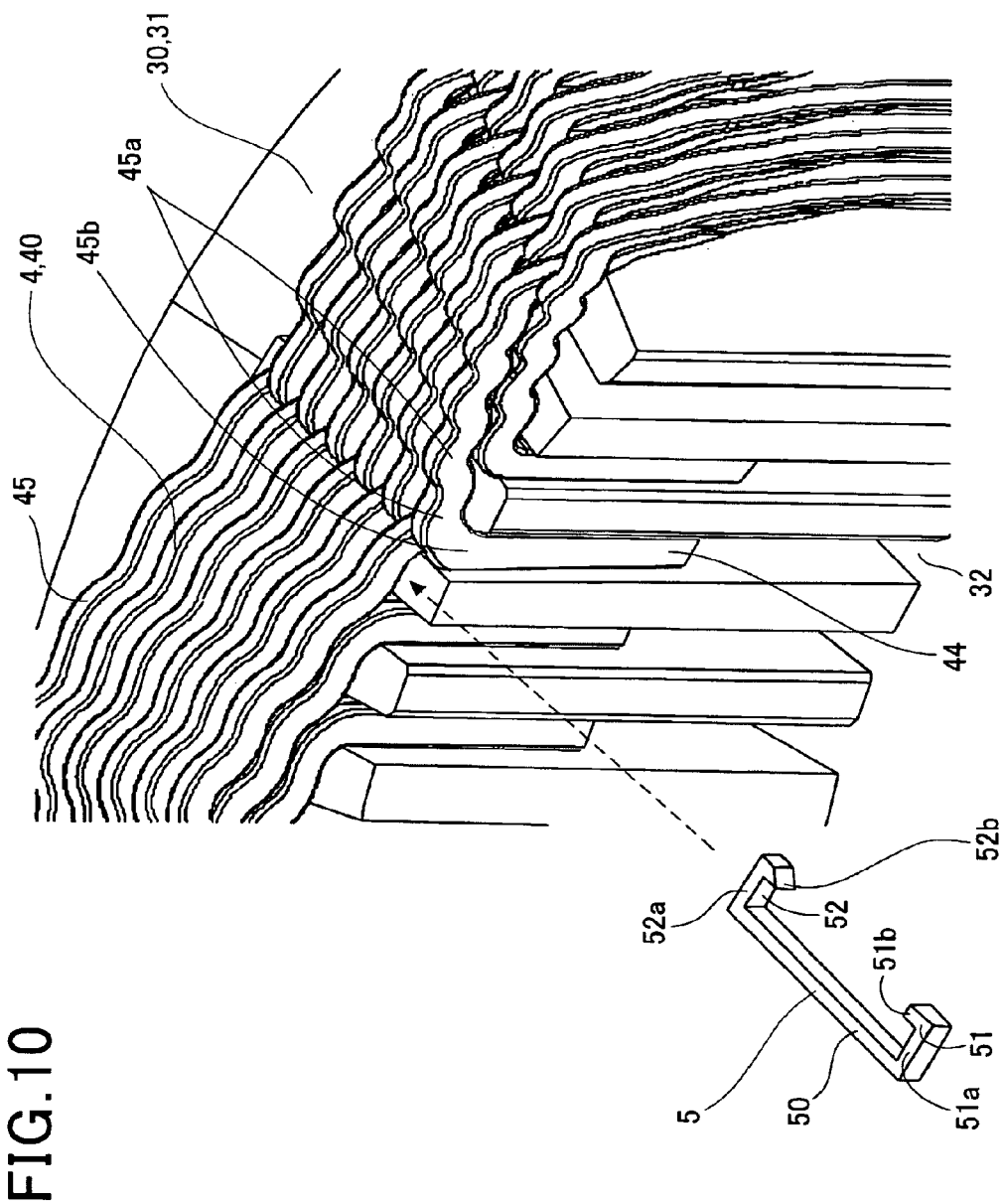
FIG. 10 is a schematic perspective view illustrating a process of mounting the restraint to the turn portions of the corresponding turn portion group of the electric wires.

More specifically, referring to FIG. 10, in the present embodiment, each of the turn portions 45 of the electric wires 40 is stepped to include a plurality of shoulder parts 45a that extend parallel to a corresponding axial end face of the stator core 30 from which the turn portion 45 protrudes. Each of the turn portions 45 also includes two end parts 45b each of which extends between a corresponding one of the in-slot portions 45 connected by the turn portion 45 and a corresponding one of the two shoulder parts 45a that are closest to the corresponding axial end face of the stator core 30 among the plurality of shoulder parts 45a.

Moreover, in the present embodiment, each of the restraints 5 is fitted to those end parts 45b of the turn portions 45 of the corresponding turn portion group which respectively adjoin the in-slot portions 44 of the electric wires 40 received in the same slot 32 of the stator core 30 and align with each other in the radial direction of the stator core 30. Consequently, for each of the restraints 5, the base part 51a of the first restraining portion 51 abuts the end part 45b of the radially-inmost turn portion 45 of the corresponding turn portion group in the radial direction of the stator core 30; the tip part 51b of the first restraining portion 51 and the connecting portion 50 together sandwich the end part 45b of the radially-inmost turn portion 45 in the circumferential direction of the stator core 30; the base part 52a of the second restraining portion 52 abuts the end part 45b of the radially-outmost turn portion 45 of the corresponding turn portion group in the radial direction of the stator core 30; and the tip part 52b of the second restraining portion 52 and the connecting portion 50 together sandwich the end part 45b of the radially-outmost turn portion 45 in the circumferential direction of the stator core 30.

After having described the configuration of the stator 3 according to the present embodiment, a manufacturing method thereof will be described hereinafter.

First, the twelve wave-shaped electric wires 40 are stacked together to form the flat band-shaped electric wire assembly 46 as shown in FIG. 6. Then, the electric wire assembly 46 is rolled by six turns to form the stator coil 4 which has a hollow cylindrical shape as shown in FIG. 7.

Thereafter, the stator core segments 31 are assembled to the stator coil 4 by inserting, in a direction from the radially outside to the radially inside of the stator coil 4, the tooth portions 33 defined by the stator core segments 31 into the spaces formed between the in-slot portions 44 of the electric wires 40. Consequently, the stator core 30 is obtained which is comprised of the stator core segments 31. In addition, in the assembly of the stator coil 4 and the stator core 30, the in-slot portions 44 of the electric wires 40 are received in the slots 32 defined by the stator core segments 31, and the turn portions 45 of the electric wires 40 are located outside of the slots 32 to form the coil ends of the stator coil 4.

Next, the restraints 5 are respectively mounted to the turn portions 45 of the corresponding turn portion groups of the electric wires 40.

More specifically, referring to FIG. 10, for each of the restraints 5, the second restraining portion 52 of the restraint 5 is first inserted, in a direction from the radially inside to the radially outside of the stator coil 4, into a space between the turn portions 45 of the corresponding turn portion group and the corresponding axial end face of the stator core 30. Then, the restraint 5 is further pressed radially outward until the second restraining portion 52 protrudes radially outside of the space. It should be noted that with the tip part 52b tapered radially inward, the second restraining portion 52 can smoothly pass through the space without being caught on the turn portions 45 defining the space. Thereafter, the restraint 5 is circumferentially slid on the corresponding axial end face of the stator core 30 toward the turn portions 45 of the corresponding turn portion group, and the first and second restraining portions 51 and 52 of the restraint 5 are respectively fitted to the end parts 45b of the radially-inmost and radially-outmost turn portions 45 of the corresponding turn portion group. It should be noted that the resin-made restraint 5 has sufficient resilience so that the fitting of the first and second restraining portions 51 and 52 to the end parts 45b of the radially-inmost and radially-outmost turn portions 45 can be made by first elastically deforming and then restoring those portions 51 and 52.

Figure 11:
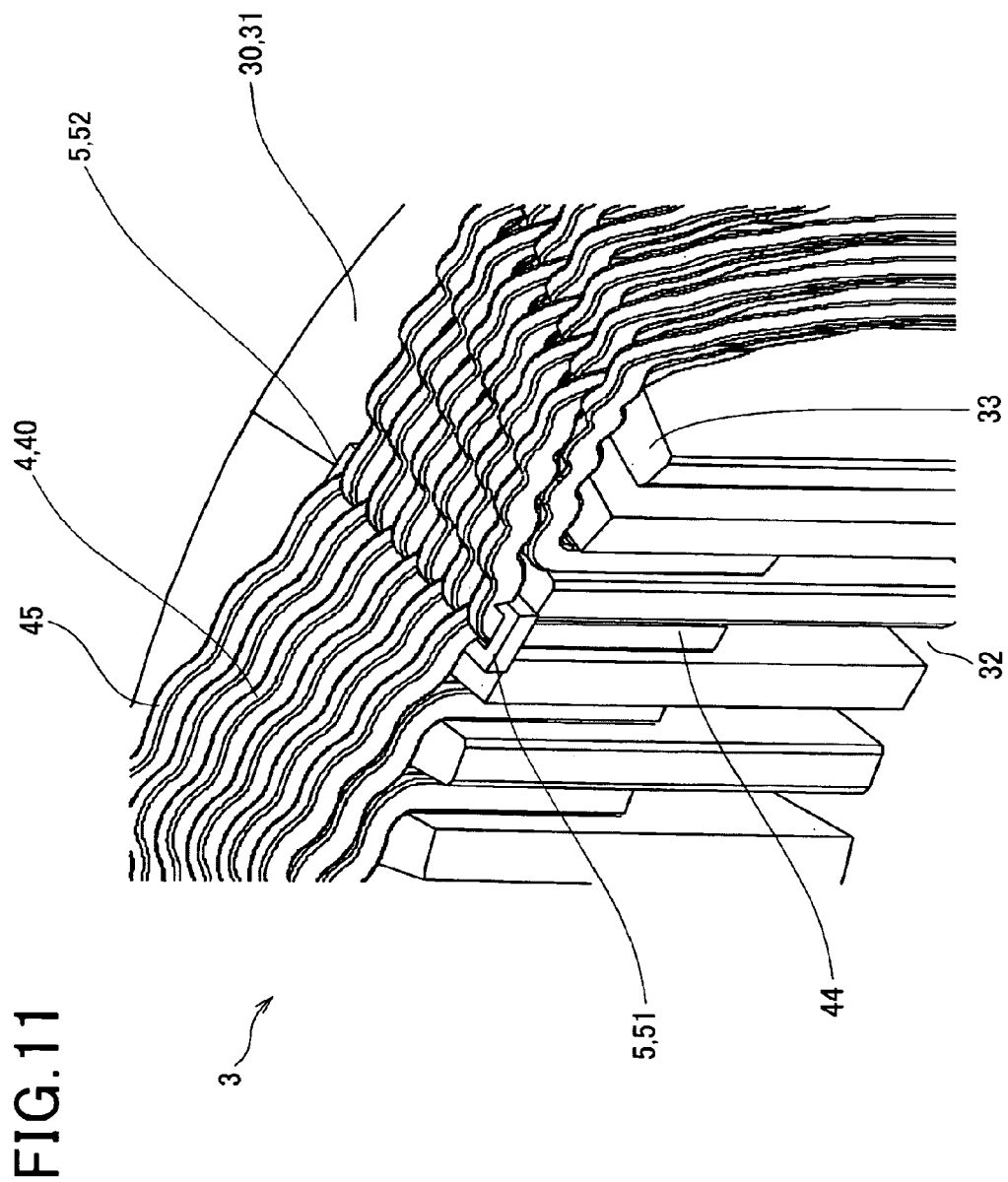
FIG. 11 is a schematic perspective view illustrating the restraint after being mounted to the turn portions of the corresponding turn portion group of the electric wires.

As a result, the stator 3 according to the present embodiment is obtained which is comprised of the stator coil 4, the stator core 30, and the restraints 5 as shown in FIG. 11.

In addition, in the present embodiment, the restraints 5 are mounted on both the axial sides of the stator core 30. During the mounting of the restraints 5, the stator core 30 is held with the axial direction thereof coinciding with the vertical direction. In this case, considering the gravity of the stator coil 4, it is preferable to mount the restraints 5 first on the bottom side and then on the top side of the stator core 30.

The above-described stator 3 according to the present embodiment has the following advantages.

In the present embodiment, the stator 3 includes the plurality of restraints 5 in addition to the stator coil 4 and the stator core 30. Each of the restraints 5 is interposed between the turn portions 45 of the corresponding turn portion group of the electric wires 40 and the corresponding axial end face of the stator core 30. Each of the restraints 5 is fitted to the end parts 45b of the turn portions 45 of the corresponding turn portion group to restrain relative radial movement between the turn portions 45 of the corresponding turn portion group.

Consequently, with the restraints 5, it is possible to prevent the turn portions 45 of the electric wires 40 from spreading in the radial direction of the stator core 30 during operation of the electric rotating machine 1. Thus, it is possible to prevent the stator coil 4 from protruding radially inward from the slots 32 of the stator core 30 to make contact with the rotor 2 of the electric rotating machine 1. As a result, it is possible to protect both the stator coil 4 and the rotor 2, thereby ensuring reliability of the electric rotating machine 1.

In particular, in the present embodiment, the stator coil 4 is formed by first stacking the electric wires 40 to form the flat band-shaped electric wire assembly 46 and then rolling the electric wire assembly 46 by six turns into the hollow cylindrical shape. In this case, the stator coil 4 tends to protrude radially inward from the slots 32 of the stator core 30 due to springback. However, with the restraints 5, it is possible to reliably prevent the stator coil 4 from protruding radially inward from the slots 32 of the stator core 30.

In the present embodiment, each of the restraints 5 is configured to include the first and second restraining portions 51 and 52 and the connecting portion 50. The first restraining portion 51 is located radially inside of and in abutment with the end part 45b of the radially-inmost turn portion of the corresponding turn portion group of the electric wires 40. The second restraining portion 52 is located radially outside of and in abutment with the end part 45b of the radially-outmost turn portion 45 of the corresponding turn portion group. The connecting portion 50 extends in the radial direction of the stator core 30 to connect the first and second restraining portions 51 and 52.

With the above configuration, the first restraining portion 51 can restrain the turn portions 45 of the corresponding turn portion group from spreading in the radially inward direction. On the other hand, the second restraining portion 52 can restrain the turn portions 45 of the corresponding turn portion group from spreading in the radially outward direction. Further, the first and second restraining portions 51 and 52 are restrained, by the connecting portion 50, from moving relative to each other. Consequently, each of the restraints 5 can restrain the turn portions 45 of the corresponding turn portion group both in the radially inward and radially outward directions.

In the present embodiment, for each of the restraints 5, the end parts 45b of the turn portions 45 of the corresponding turn portion group are restrained between the first and second restraining portions 51 and 52 of the restraint 5 under a compressive pressure applied by the first and second restraining portions 51 and 52.

Consequently, it is possible to more reliably prevent the turn portions 45 of the electric wires 40 from spreading in the radial direction of the stator core 30 during operation of the electric rotating machine 1. In addition, the electric wires 40 can be more densely arranged, thereby improving the magnetic properties of the stator coil 4.

In the present embodiment, for each of the restraints 5, the first restraining portion 51 is substantially L-shaped to include the base part 51a and the tip part 51b. The base part 51a is connected to the radially inner end of the connecting portion 50 and extends perpendicular to the connecting portion 50. The tip part 51b extends radially outward from the base part 51a to interpose the end part 45b of the radially-inmost turn portion of the corresponding turn portion group between itself and the connecting portion 50. The second restraining portion 52 is also substantially L-shaped to include the base part 52a and the tip part 52b. The base part 52a is connected to the radially outer end of the connecting portion 50 and extends perpendicular to the connecting portion 50. The tip part 52b extends radially inward from the base part 52a to interpose the end part 45b of the radially-outmost turn portion 45 of the corresponding turn portion group between itself and the connecting portion 50.

With the above configuration, each of the restraints 5 can be easily and reliably mounted to the turn portions 45 of the corresponding turn portion group of the electric wires 40.

Further, in the present embodiment, for each of the restraints 5, the tip part 52b of the second restraining portion 52 is tapered radially inward with the side surface thereof on the opposite side to the connecting portion 50 extending obliquely with respect to the connecting portion 50.

With the above configuration, in mounting the restraint 5 to the end parts 45b of the turn portions 45 of the corresponding turn portion group, the second restraining portion 52 can smoothly pass through the space between the turn portions 45 and the corresponding axial end face of the stator core 30 without being caught on the turn portions 45.

In the present embodiment, each of the turn portions 45 of the electric wires 40 is stepped to include the plurality of shoulder parts 45a that extend parallel to the corresponding axial end face of the stator core 30 from which the turn portion 45 protrudes.

With the above configuration of the turn portions 45, it is possible to reduce the protruding height of the turn portions 45 from the corresponding axial end faces of the stator core 30, thereby reducing the axial length of the stator core 3.

Modification of First Embodiment

In the previous embodiment, each of the restraints 5 is made of the phenol resin. However, each of the restraints 5 may also be made of other materials.

Figure 12:
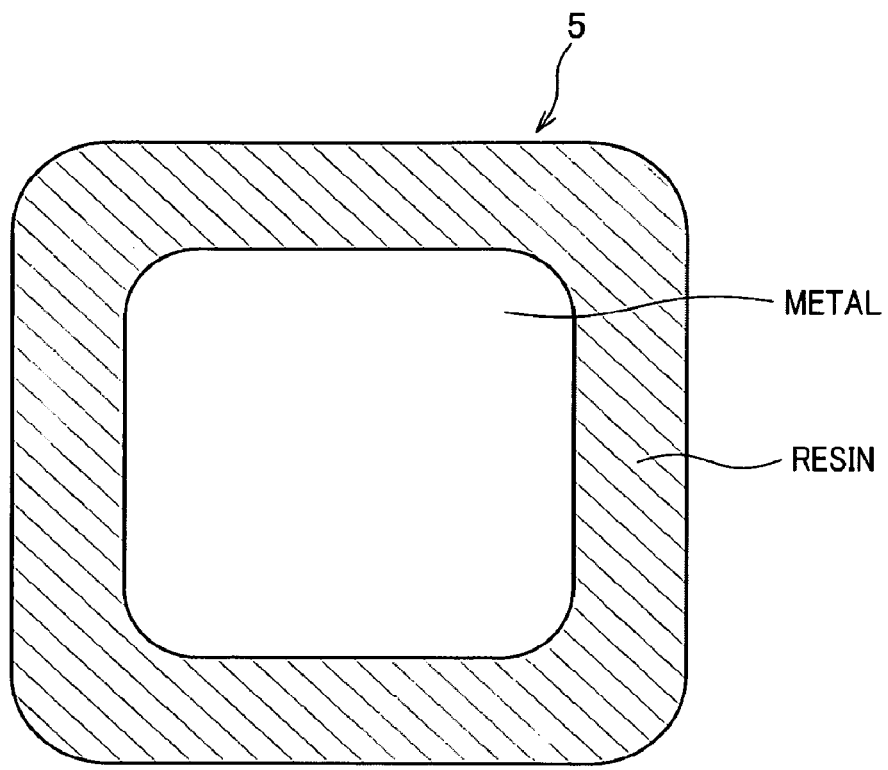
FIG. 12 is a cross-sectional view illustrating a modification of the first embodiment.

For example, as shown in FIG. 12, each of the restraints 5 may be made of a metal, which forms a core of the restraint 5, and an electrically-insulative resin that forms an insulating coat to cover the core. In this case, it is possible to enhance mechanical strength of the restraints 5 while ensuring insulation properties of the stator 3.

Second Embodiment

Figure 13:
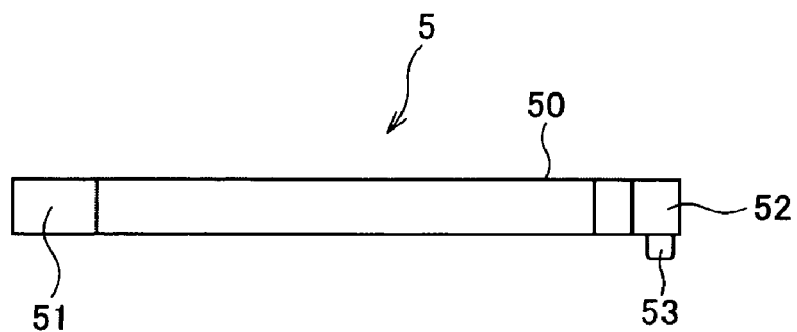
FIG. 13 is a side view of a restraint according to the second embodiment of the invention.

In this embodiment, as shown in FIG. 13, each of the restraints 5 includes the connecting portion 50 and the first and second restraining portions 51 and 52 as in the first embodiment. In addition, each of the restraints 5 further includes a protrusion 53 that is formed on a boundary area between the connecting portion 50 and the second restraining portion 52 on the contact surface of the restraint 5 which contacts with the corresponding axial end face of the stator core 30. The protrusion 53 has a substantially cylindrical shape.

Figure 14:
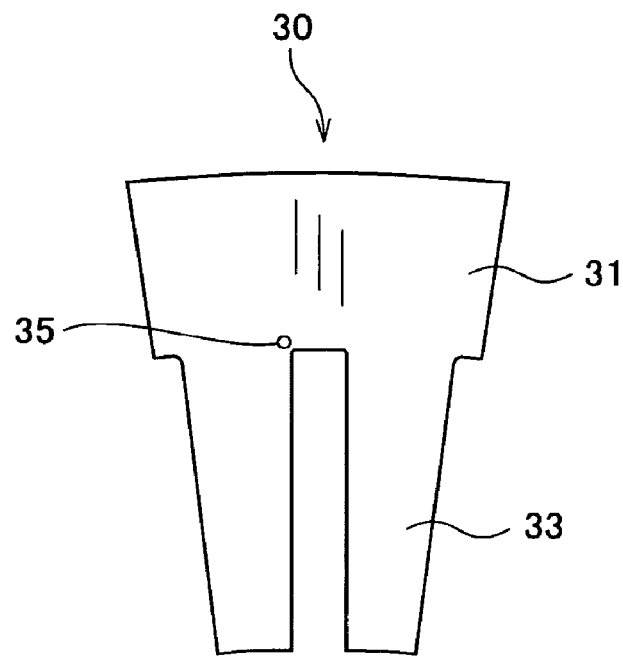
FIG. 14 is a front view of a stator core segment according to the second embodiment.

In assembling the stator 3, the protrusion 53 is fitted into a recess 35 which is formed on the corresponding axial end face of the stator core 30 as shown in FIG. 14. The recess 35 has a cylindrical interior surface that substantially coincides with the surface of the protrusion 53. Consequently, the protrusion 53 is restrained by the recess 35 from moving in any direction perpendicular to the axial direction of the stator core 30.

Figure 15:
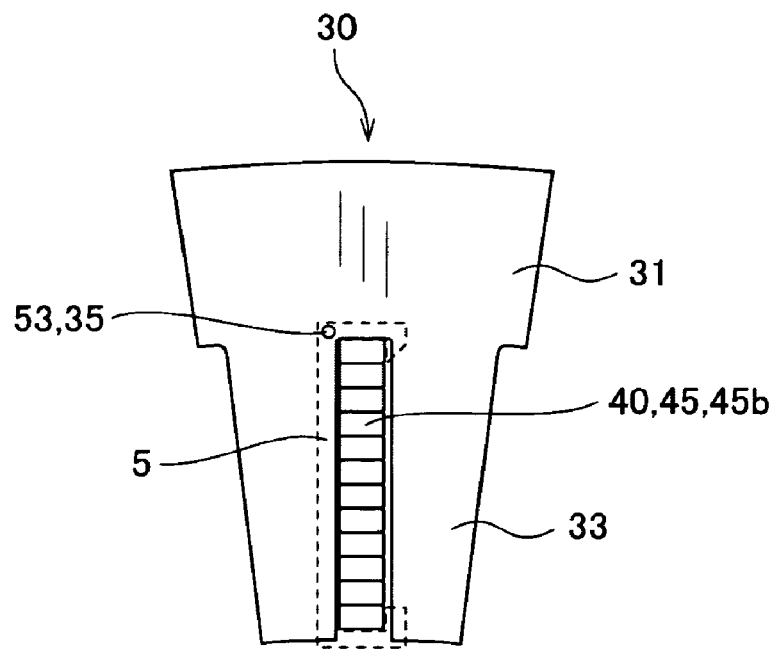
FIGS. 15 and 16 are schematic views illustrating the restraint of FIG. 13 after being mounted to the stator core segment of FIG. 14.
Figure 16:
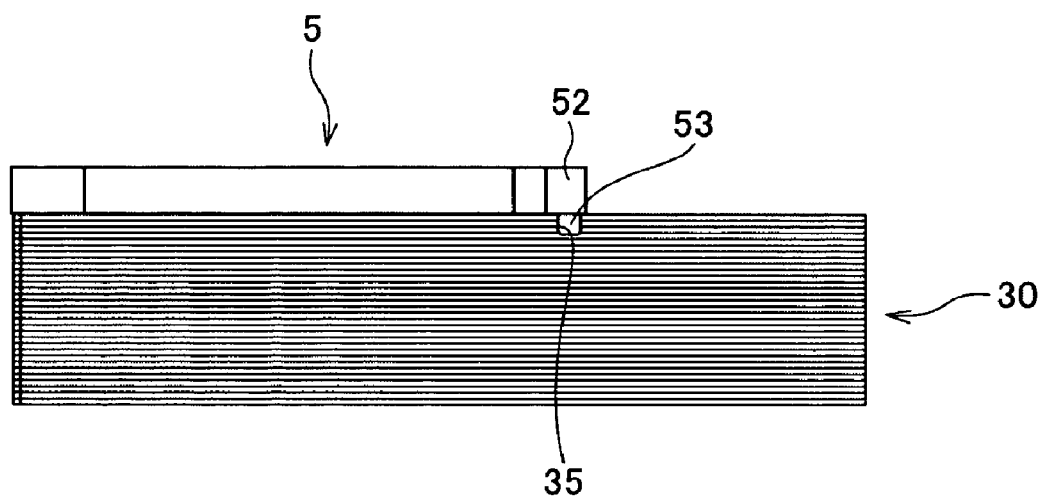

FIGS. 15 and 16 illustrate the protrusion 53 after being fitted into the recess 35.

With the engagement between the protrusion 53 and the recess 35, it is possible to easily fix the relative position between the restraint 5 and the stator core 30. In other words, it is possible to easily position the restraint 5 with respect to the stator core 30. In addition, it is also possible to restrain relative radial movement between the restraint 5 and the stator core 30, thereby restraining relative radial movement between the turn portions 45 of the corresponding turn portion group of the electric wires 40 and the stator core 30.

Furthermore, in the present embodiment, the protrusion 53 is formed on the contact surface of the restraint 5 so as to be located radially outside of the end part 45b of the radially-outmost turn portion 45 of the corresponding turn portion group.

To reliably prevent the stator coil 4 from making contact with the rotor 2, it is preferable to insert the restraint 5 into the space between the turn portions 45 of the corresponding turn portion group and the corresponding axial end face of the stator core 30 in the direction from the radially inside to the radially outside of the stator coil 4. In this case, with the location of the protrusion 53 as described above, it is possible to easily and reliably fix the restraint 5 with respect to the stator core 30.

Modification of Second Embodiment

In the second embodiment, the protrusion 53 of each of the restraints 5 has the substantially cylindrical shape. However, the protrusion 53 may also have other shapes, such as a prismatic shape or a conical shape.

Moreover, in the second embodiment, the protrusion 53 is fitted into the recess 35 of the stator core 30 which has the cylindrical interior surface substantially coinciding with the surface of the protrusion 53. However, instead of the recess 35, a groove may be formed on the corresponding axial end face of the stator core 30 to extend in the circumferential direction of the stator core 30; the protrusion 53 may be inserted into the groove, thereby being restrained by the groove from moving in the radial direction of the stator core 30.

Third Embodiment

Figure 17:
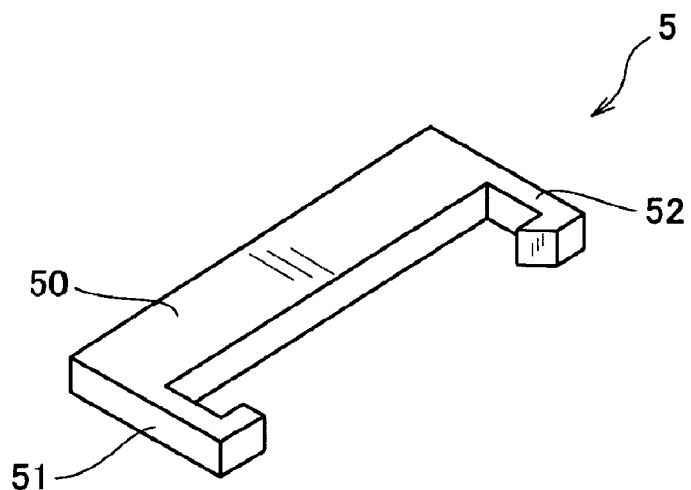
FIG. 17 is a perspective view of a restraint according to the third embodiment of the invention.

In this embodiment, as shown in FIG. 17, each of the restraints 5 includes the connecting portion 50 and the first and second restraining portions 51 and 52 as in the first embodiment. Moreover, the first and second restraining portions 51 and 52 are identical to those in the first embodiment. However, the connecting portion 50 has a larger width than that in the first embodiment, and more particularly has a width equal to the width of the tooth portions 33 of the stator core 30 at the radially inner periphery of the stator core 30.

Figure 18:
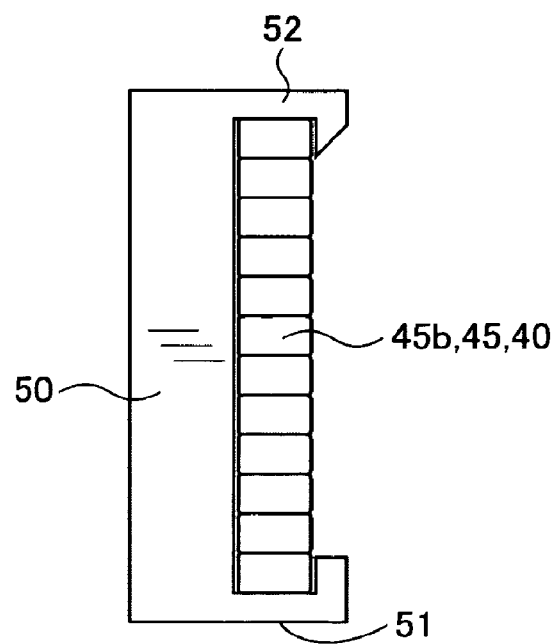
FIG. 18 is a schematic side view illustrating the restraint according to the third embodiment after being mounted to the turn portions of the corresponding turn portion group of the electric wires.
Figure 19:
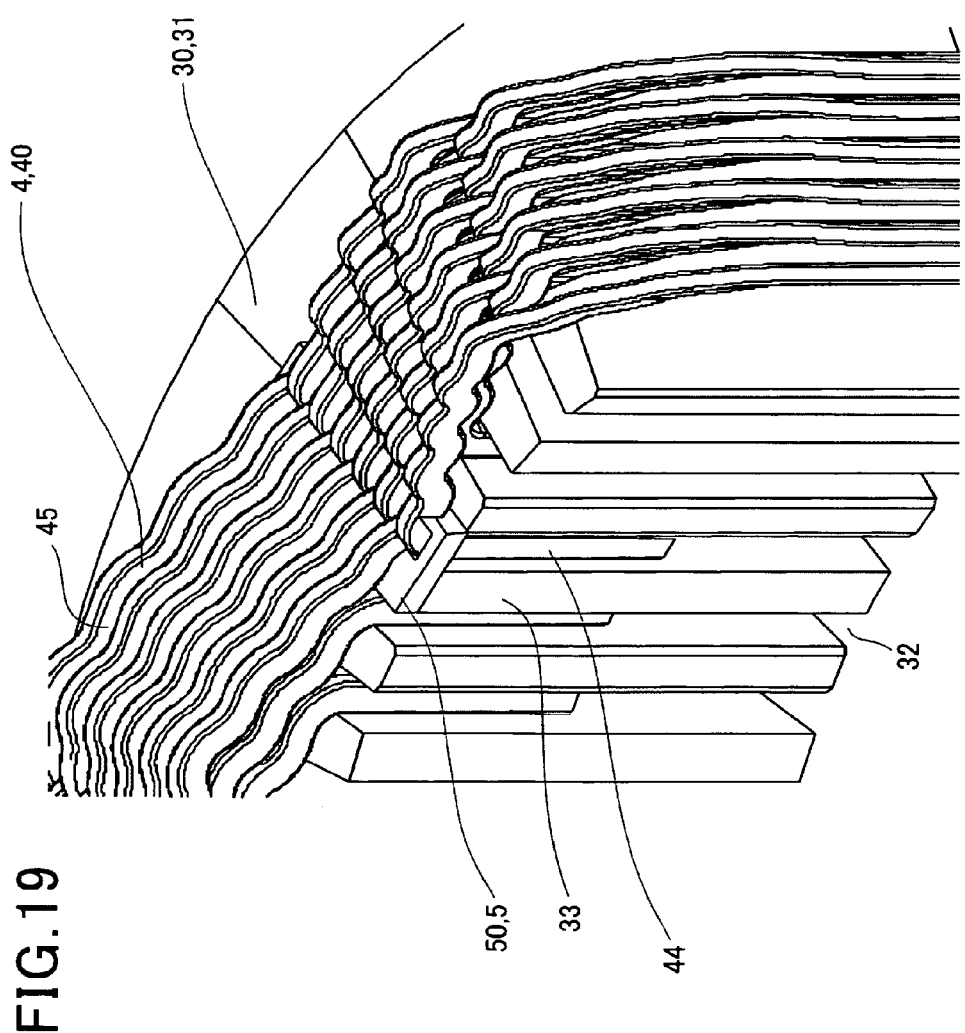
FIG. 19 is a schematic perspective view illustrating the restraint according to the third embodiment after being mounted to the turn portions of the corresponding turn portion group of the electric wires.

FIGS. 18 and 19 illustrate one of the restraints 5 after being mounted to the turn portions 45 of the corresponding turn portion group of the electric wires 40.

By setting the width of the connecting portions 50 of the restraints 5 as above, it is possible to restrain relative movement between the restraints 5 and the stator core 30, thereby restraining relative movement between the turn portions 45 of the electric wires 40 and the stator core 30.

Fourth Embodiment

Figure 20:
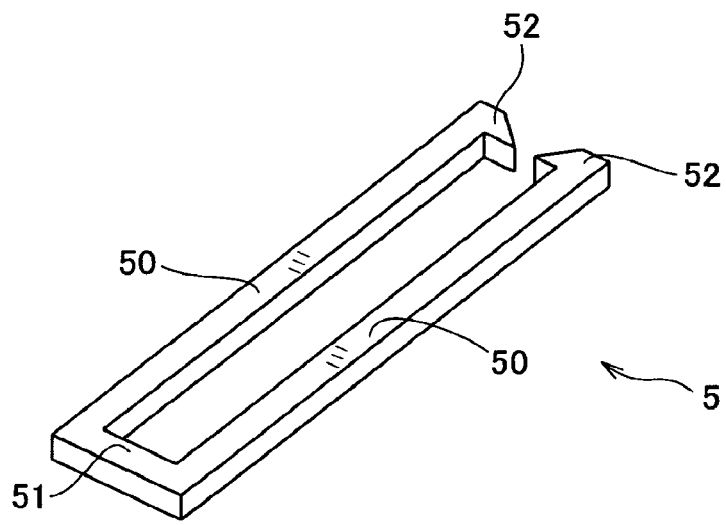
FIG. 20 is a perspective view of a restraint according to the fourth embodiment of the invention.

In this embodiment, as shown in FIG. 20, each of the restraints 5 has a substantially U-shape. More specifically, each of the restraints 5 has a pair of connecting portions 50, a first restraining portion 51, and a pair of second restraining portions 52 that are connected with the first restraining portion 51 respectively by the connecting portions 50.

Figure 21:
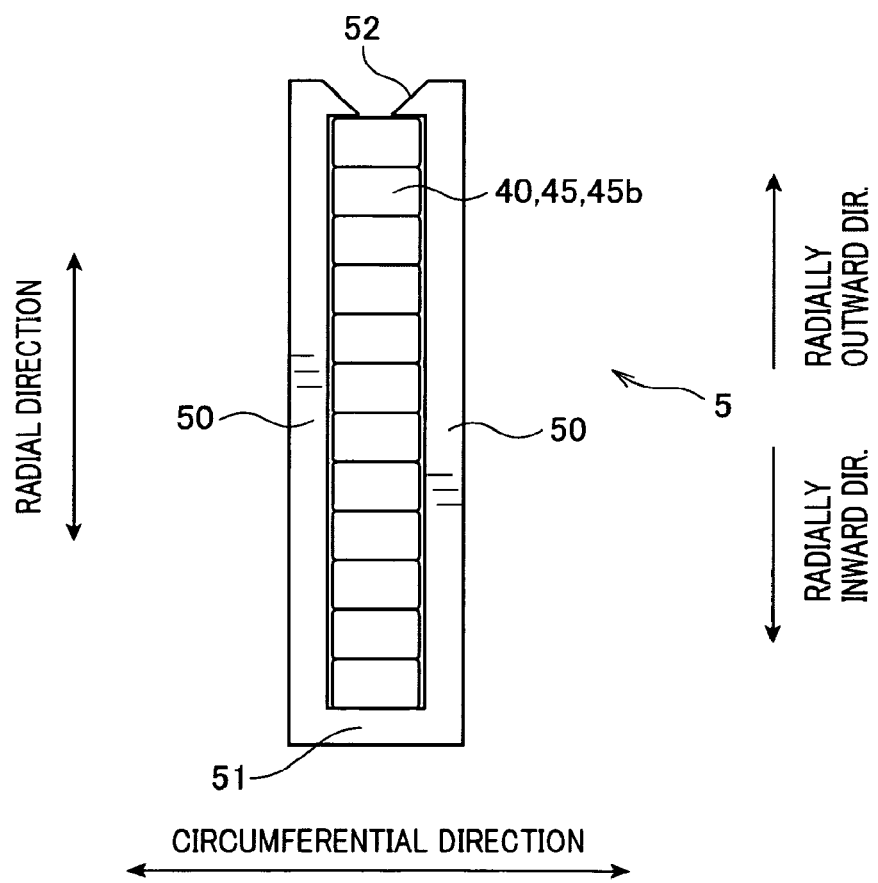
FIG. 21 is a schematic side view illustrating the restraint according to the fourth embodiment after being mounted to the turn portions of the corresponding turn portion group of the electric wires.
Figure 22:
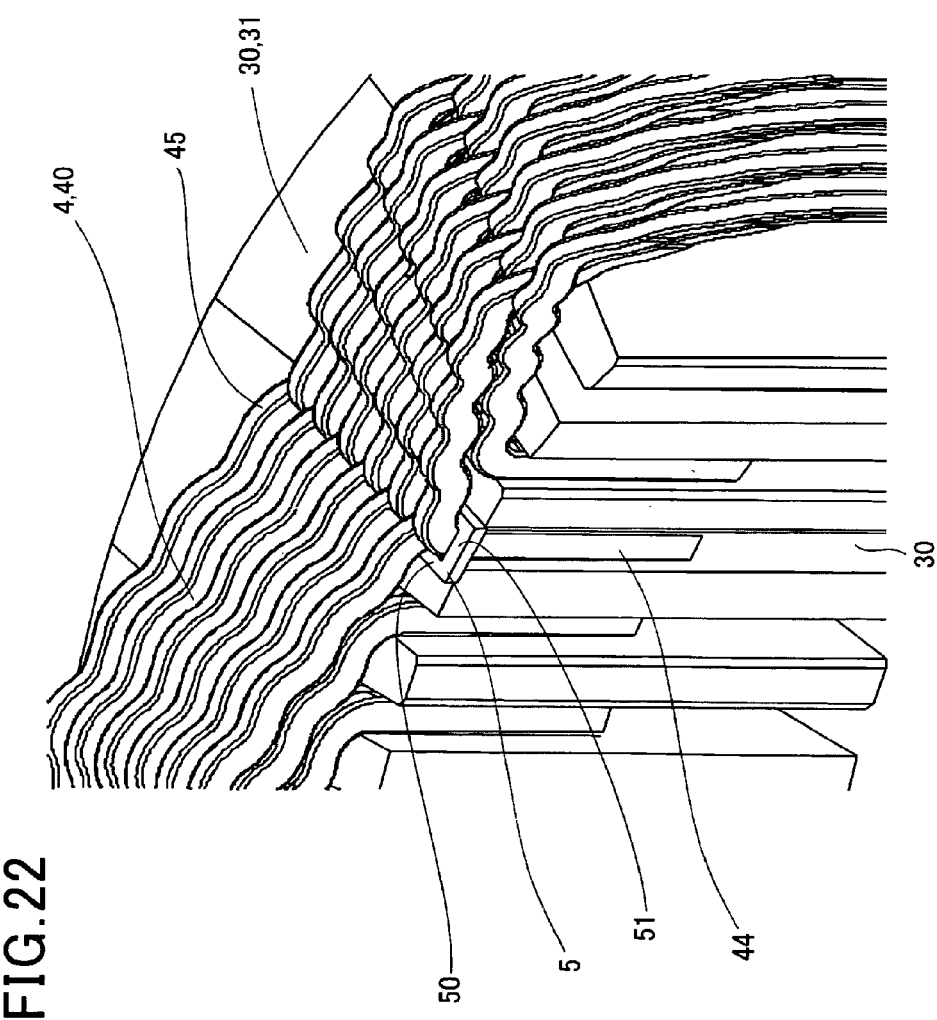
FIG. 22 is a schematic perspective view illustrating the restraint according to the fourth embodiment after being mounted to the turn portions of the corresponding turn portion group of the electric wires.

The first restraining portion 51 has the shape of a bar with a rectangular cross section. After assembly of the stator 3, as illustrated in FIGS. 21 and 22, the first restraining portion 51 extends perpendicular to the radial direction of the stator core 30, with the radially outer side surface of the first restraining portion 51 abutting the end part 45b of the radially-inmost turn portion 45 of the corresponding turn portion group.

Each of the connecting portions 50 also has the shape of a bar with a rectangular cross section. The connecting portions 50 extend, respectively from opposite ends of the first restraining portion 51, perpendicular to the first restraining portion 51. The interval between the connecting portions 50 is substantially equal to the width of the electric wires 40. After assembly of the stator 3, as illustrated in FIGS. 21 and 22, the connecting portions 50 sandwich the end parts 45b of the turn portions 45 of the corresponding turn portion group in the circumferential direction of the stator core 30.

The second restraining portions 52 extend, respectively from the radially outer ends of the connecting portions 50, perpendicular to the connecting portions 50 and toward each other. In addition, the second restraining portions 52 are tapered with their radially outer side surfaces extending obliquely with respect to the connecting portions 50. After assembly of the stator 3, as illustrated in FIGS. 21 and 22, the radially inner side surfaces of the second restraining portions 52 abut the end part 45b of the radially-outmost turn portion 45 of the corresponding turn portion group. Moreover, the first restraining portion 51 and the second restraining portions 52 sandwich the end parts 45b of the turn portions 45 of the corresponding turn portion group in the radial direction of the stator core 30.

Each of the restraints 5 is inserted, in a direction from the radially inside to the radially outside of the stator coil 4, into the spaces between the turn portions 45 of the corresponding turn portion group and the corresponding axial end face of the stator core 30. During the insertion, with the tapered second restraining portions 52, the connecting portions 50 are gradually elastically spread apart. After the insertion, the connecting portions 50 spring back to their initial non-spread positions.

In the present embodiment, as illustrated in FIGS. 21 and 22, for each of the restraints 5, the first restraining portion 51 and the second restraining portions 52 sandwich the end parts 45b of the turn portions 45 of the corresponding turn portion group in the radial direction of the stator core 30, thereby restraining relative radial movement between the turn portions 45 of the corresponding turn portion group. Moreover, the connecting portions 50 sandwich the end parts 45b of the turn portions 45 of the corresponding turn portion group in the circumferential direction of the stator core 30, thereby restraining relative circumferential movement between the turn portions 45 of the corresponding turn portion group. As a result, it is possible to prevent the turn portions 45 of the corresponding turn portion group of the electric wires 40 both from spreading in the radial direction of the stator core 30 and from spreading in the circumferential direction of the stator core 30 during operation of the electric rotating machine 1.

Fifth Embodiment

Figure 23:
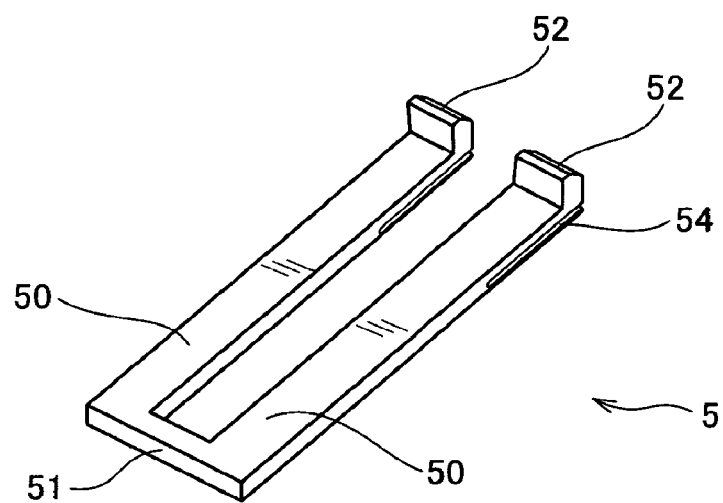
FIG. 23 is a perspective view of a restraint according to the fifth embodiment of the invention.
Figure 24:
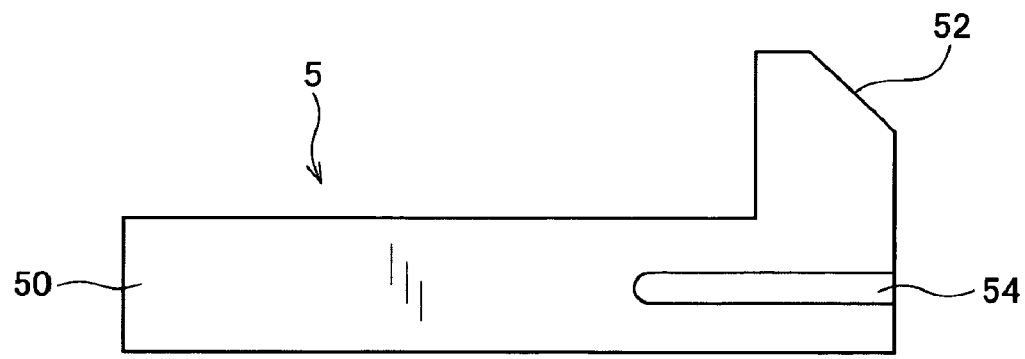
FIG. 24 is a side view of the restraint according to the fifth embodiment.

In this embodiment, as shown in FIGS. 23 and 24, each of the restraints 5 has a substantially U-shape. More specifically, each of the restraints 5 has a pair of connecting portions 50, a first restraining portion 51, and a pair of second restraining portion 52 that are connected with the first restraining portion 51 respectively by the connecting portions 50.

Figure 25:
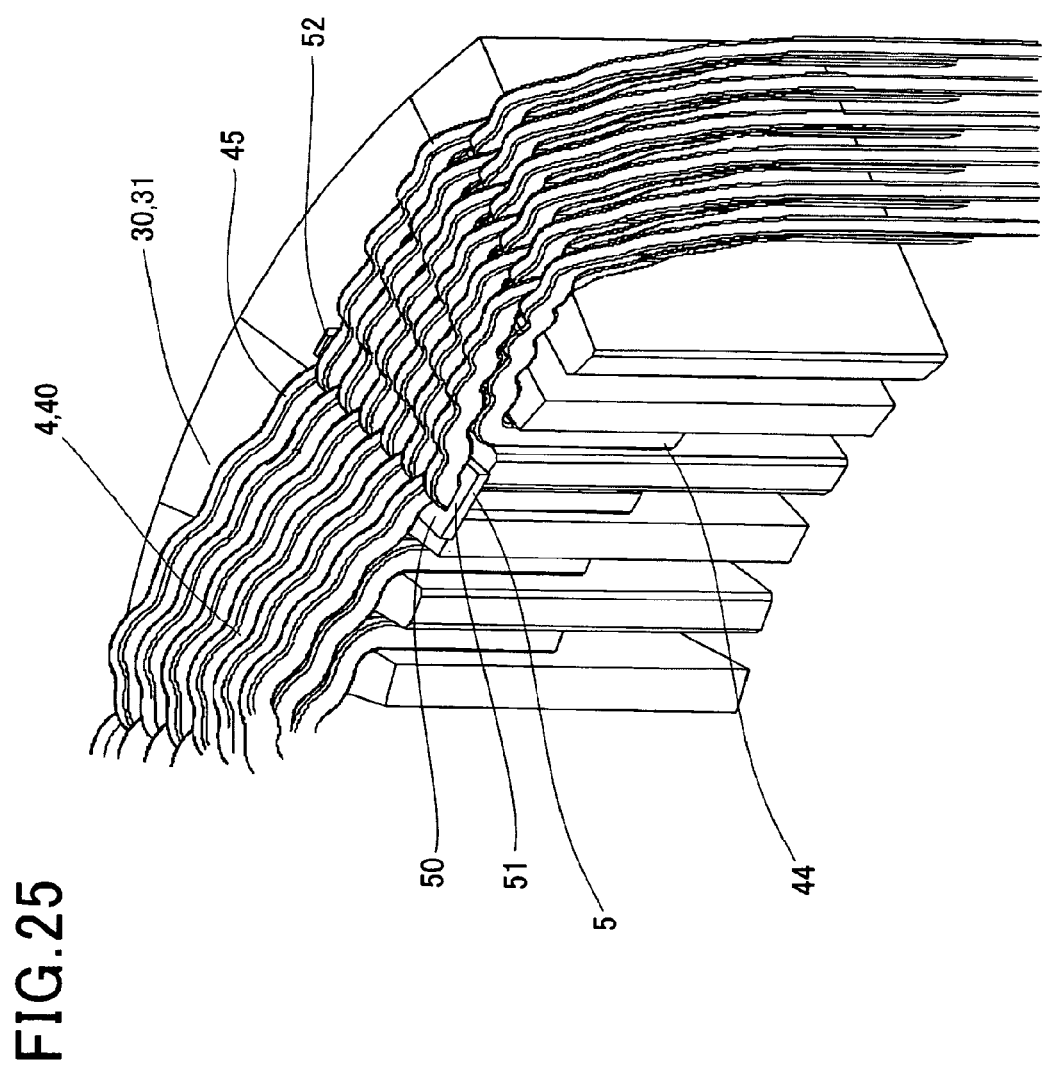
FIG. 25 is a schematic perspective view illustrating the restraint according to the fifth embodiment after being mounted to the turn portions of the corresponding turn portion group of the electric wires.

The first restraining portion 51 has the shape of a bar with a rectangular cross section. After assembly of the stator 3, as illustrated in FIG. 25, the first restraining portion 51 extends perpendicular to the radial direction of the stator core 30, with the radially outer side surface of the first restraining portion 51 abutting the end part 45b of the radially-inmost turn portion 45 of the corresponding turn portion group.

Each of the connecting portions 50 also has the shape of a bar with a rectangular cross section. The connecting portions 50 extend, respectively from opposite ends of the first restraining portion 51, perpendicular to the first restraining portion 51. The interval between the connecting portions 50 is substantially equal to the width of the electric wires 40. After assembly of the stator 3, as illustrated in FIG. 25, the connecting portions 50 sandwich the end parts 45b of the turn portions 45 of the corresponding turn portion group in the circumferential direction of the stator core 30. In addition, as shown in FIGS. 23 and 24, each of the connecting portions 50 has a cut 54 formed in the distal end surface (i.e., the radially outer end surface) thereof.

The second restraining portions 52 extend, respectively from the radially outer ends of the connecting portions 50, perpendicular to the major surfaces of the connecting portions 50 toward the same side. In addition, the second restraining portions 52 are tapered with their radially outer side surfaces extending obliquely with respect to the connecting portions 50. After assembly of the stator 3, as illustrated in FIG. 25, the second restraining portions 52 are located radially outside of the end part 45b of the radially-outmost turn portion 45 of the corresponding turn portion group.

Each of the restraints 5 is inserted, in a direction from the radially inside to the radially outside of the stator coil 4, into the spaces between the turn portions 45 of the corresponding turn portion group and the corresponding axial end face of the stator core 30. During the insertion, with the cuts 54 formed in the distal end surfaces thereof, the connecting portions 50 are elastically deformed to decrease in height at the distal ends. However, after the insertion, the connecting portions 50 spring back to recover their initial height at the distal ends.

In the present embodiment, as illustrated in FIG. 25, for each of the restraints 5, the first restraining portion 51 restrains the turn portions of the corresponding turn portion group from moving in the radially inward direction, while the second restraining portions 52 restrain the same from moving in the radially outward direction. Thus, relative radial movement between the turn portions 45 of the corresponding turn portion group is restrained by the first and second restraining portions 51 and 52. Moreover, the connecting portions 50 sandwich the end parts 45b of the turn portions 45 of the corresponding turn portion group in the circumferential direction of the stator core 30, thereby restraining relative circumferential movement between the turn portions 45 of the corresponding turn portion group. As a result, it is possible to prevent the turn portions 45 of the corresponding turn portion group of the electric wires 40 both from spreading in the radial direction of the stator core 30 and from spreading in the circumferential direction of the stator core 30 during operation of the electric rotating machine 1.

Sixth Embodiment

Figure 26:
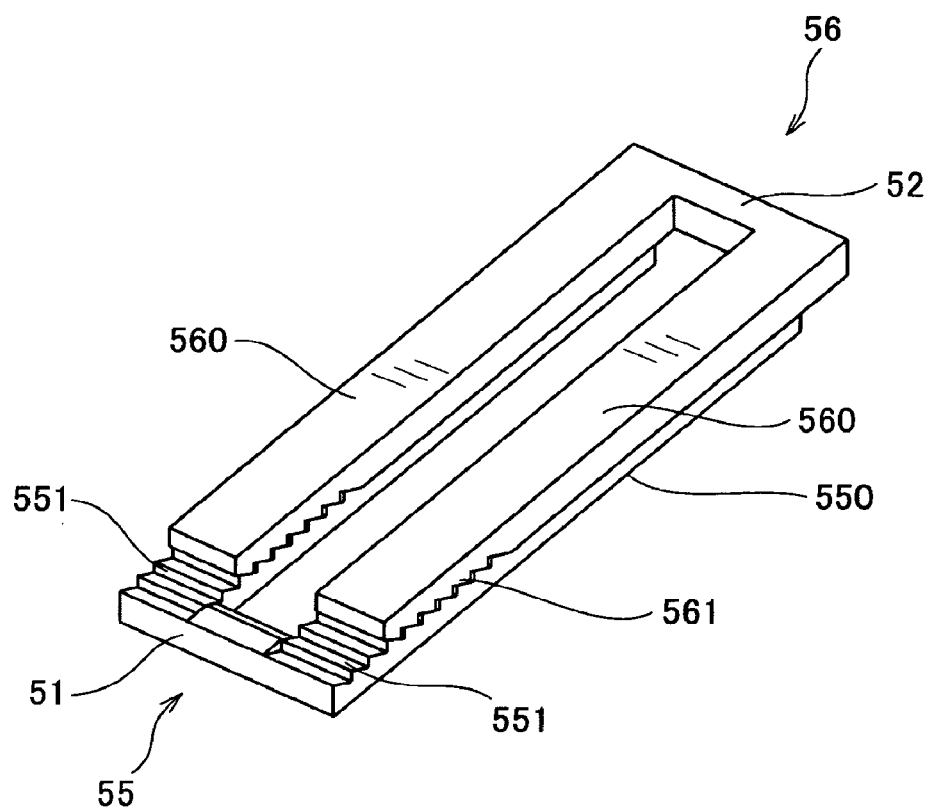
FIG. 26 is a perspective view of a restraint according to the sixth embodiment of the invention.
Figure 27:
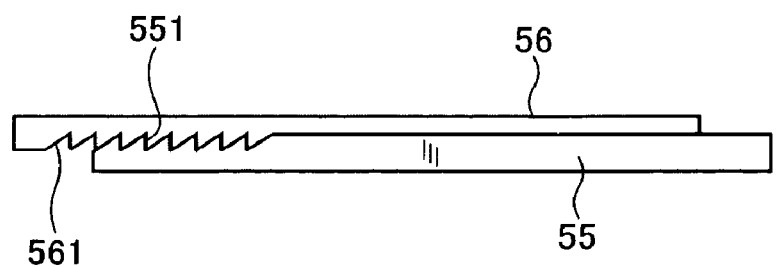
FIG. 27 is a side view of the restraint according to the sixth embodiment.

In this embodiment, as shown in FIGS. 26 and 27, each of the restraints 5 is comprised of a pair of first and second restraint pieces 55 and 56.

The first restraint piece 55 has a substantially U-shape to include a first retraining portion 51 and a pair of first connecting portions 550.

The first restraining portion 51 has the shape of a bar with a rectangular cross section. After assembly of the stator 3, the first restraining portion 51 extends perpendicular to the radial direction of the stator core 30, with the radially outer side surface of the first restraining portion 51 abutting the end part 45b of the radially-inmost turn portion of the corresponding turn portion group.

Each of the first connecting portions 550 also has the shape of a bar with a rectangular cross section. The first connecting portions 550 extend, respectively from opposite ends of the first restraining portion 51, perpendicular to the first restraining portion 51. The interval between the first connecting portions 550 is substantially equal to the width of the electric wires 40. Moreover, each of the first connecting portions 550 has teeth 551 that are formed in a base end portion (i.e., a radially inner end portion) of a major surface of the first connecting portion 550 which faces away from the stator core 30.

The second restraint piece 56 has a substantially U-shape to include a second retraining portion 52 and a pair of second connecting portions 560.

The second restraining portion 52 has the shape of a bar with a rectangular cross section. After assembly of the stator 3, the second restraining portion 52 extends perpendicular to the radial direction of the stator core 30, with the radially inner side surface of the second restraining portion 52 abutting the end part 45b of the radially-outmost turn portion 45 of the corresponding turn portion group.

Each of the second connecting portions 560 also has the shape of a bar with a rectangular cross section. The second connecting portions 560 extend, respectively from opposite ends of the second restraining portion 52, perpendicular to the second restraining portion 52. The interval between the second connecting portions 560 is substantially equal to the width of the electric wires 40. Moreover, each of the second connecting portions 560 has teeth 561 that are formed in a tip end portion (i.e., a radially inner end portion) of a major surface of the second connecting portion 560 which faces toward the stator core 30.

In mounting each of the restraints 5 to the end parts 45b of the turn portions 45 of the corresponding turn portion group, the first restraint piece 55 is first inserted, in a direction from the radially inside to the radially outside of the stator coil 4, into the space between the turn portions 45 of the corresponding turn portion group and the corresponding axial end face of the stator core 30. Then, the second restraint piece 56 is inserted, in a direction from the radially outside to the radially inside of the stator coil 4, into the same space, thereby bringing the teeth 561 of the second connecting portions 560 into mesh with the teeth 551 of the first connecting portions 550 as illustrated in FIGS. 26 and 27.

Figure 28:
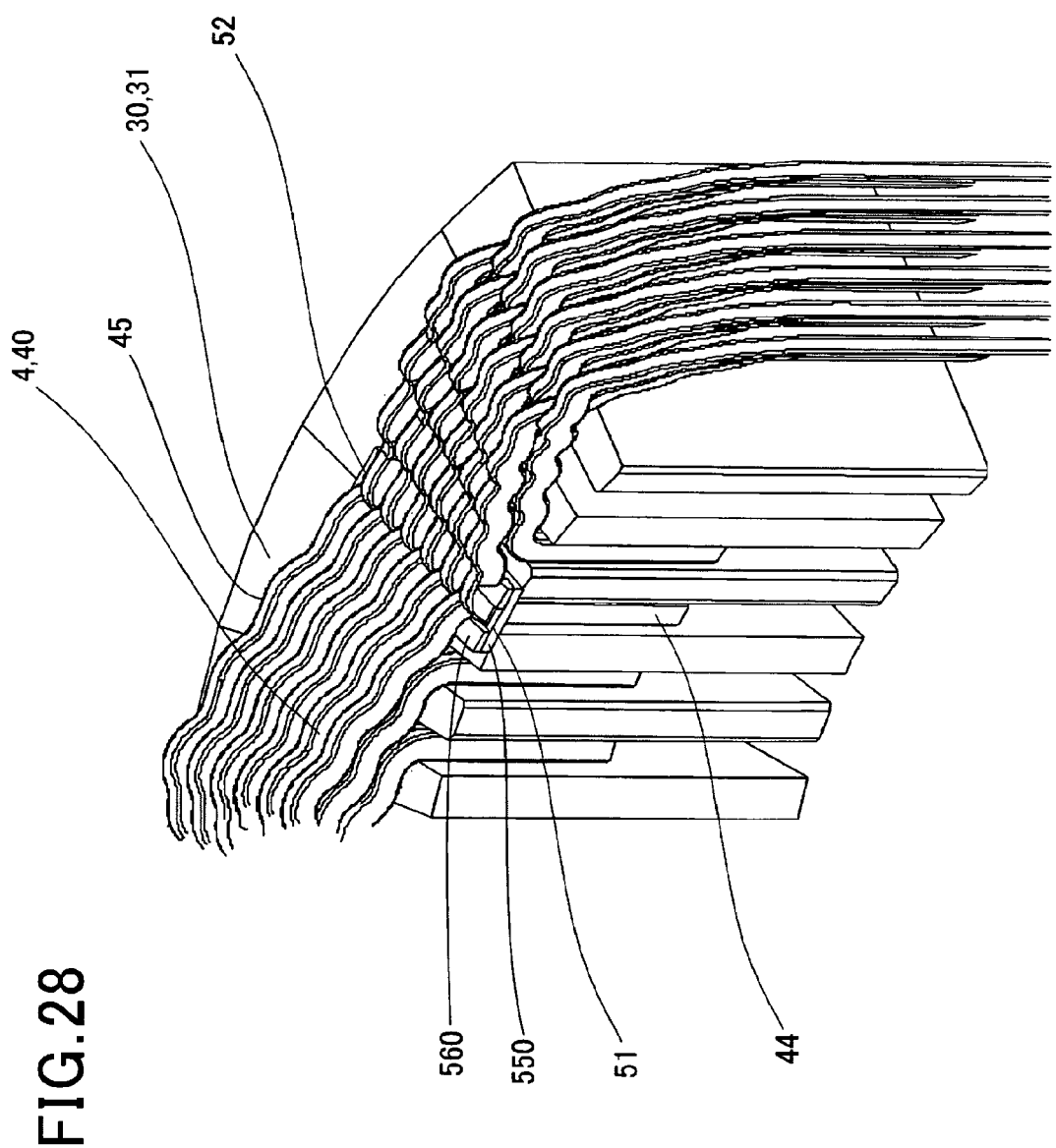
FIG. 28 is a schematic perspective view illustrating the restraint according to the sixth embodiment after being mounted to the turn portions of the corresponding turn portion group of the electric wires.

FIG. 28 illustrates one of the restraints 5 after being mounted to the turn portions 45 of the corresponding turn portion group of the electric wires 40.

In the present embodiment, for each of the restraints 5, the first and second restraining portions 51 and 52 sandwich the end parts 45b of the turn portions 45 of the corresponding turn portion group in the radial direction of the stator core 30, thereby restraining relative radial movement between the turn portions 45 of the corresponding turn portion group. Moreover, the engaged pairs of the first and second connecting portions 550 and 560 sandwich the end parts 45b of the turn portions 45 of the corresponding turn portion group in the circumferential direction of the stator core 30, thereby restraining relative circumferential movement between the turn portions 45 of the corresponding turn portion group. As a result, it is possible to prevent the turn portions 45 of the corresponding turn portion group both from spreading in the radial direction of the stator core 30 and from spreading in the circumferential direction of the stator core 30 during operation of the electric rotating machine 1.

Furthermore, for each of the restraints 5, as illustrated in FIG. 28, both the first and second restraining portions 51 and 52 extend across the boundary between an adjacent pair of the stator core segments 31 of the stator core 30. Moreover, with the first connecting portions 550 overlapping the second connecting portions 560, the width of the restraint 5 in the axial direction of the stator core 30 is increased. Consequently, the restraint 5 also can restrain relative movement between the turn portions 45 of the corresponding turn portion group and the stator core 30.

Accordingly, in the present embodiment, each of the restraints 5 can function both as a restraint for restraining relative movement between the turn portions 45 of the corresponding turn portion group and the stator core 30 and as a restraint for restraining relative radial and circumferential movements between the turn portions 45 in the corresponding turn portion group.

Consequently, with the restraints 5, it is not necessary to apply an impregnating material for the purpose of restraining relative movement between the stator coil 4 and the stator core 30. As a result, the manufacturing cost of the stator 3 can be reduced.

In addition, with the restraints 5, it is also possible to prevent the stator core segments 31 of the stator core 30 from being separated from each other due to vibrations and/or thermal and mechanical stresses imposed thereon during operation of the electrical rotating machine.

Seventh Embodiment

In this embodiment, the stator 3 of the electric rotating machine 1 includes a plurality of restraints 6 instead of the restraints 5 described in the previous embodiments.

Figure 29:
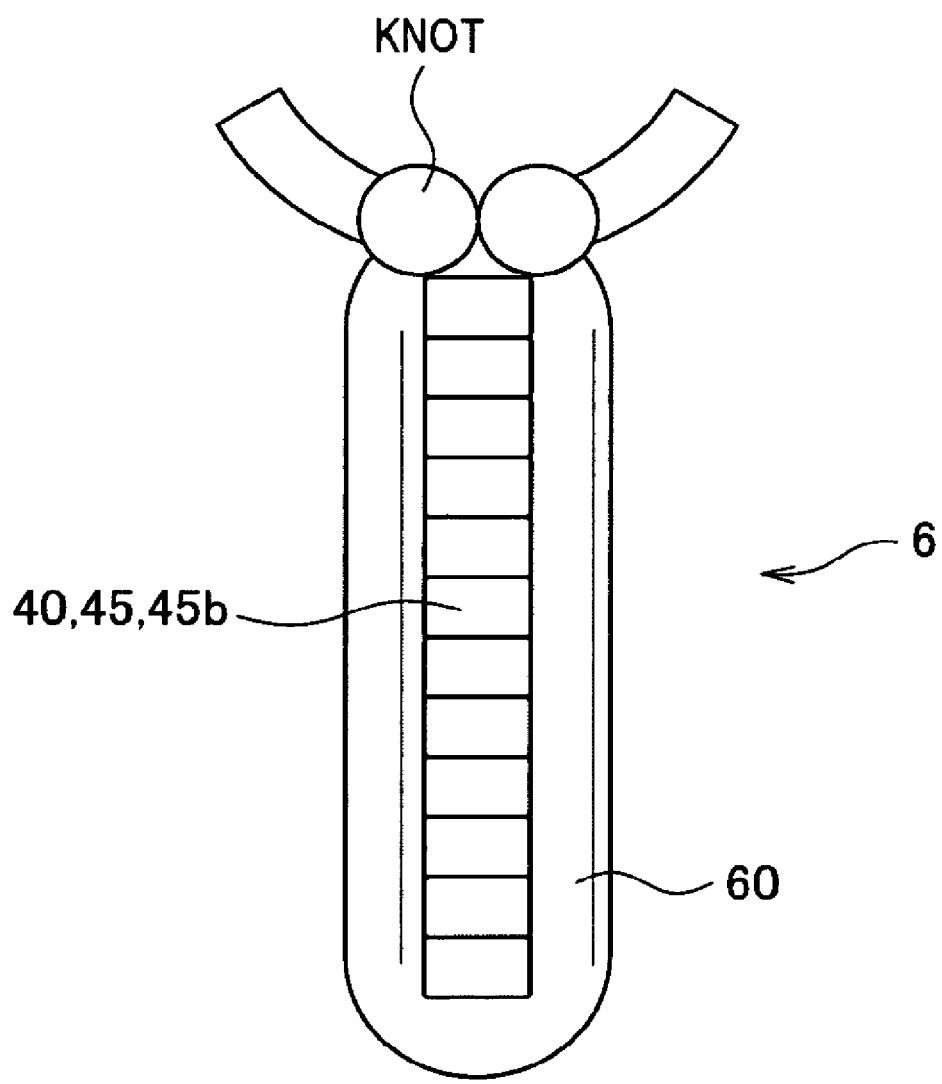
FIG. 29 is a schematic side view illustrating a restraint according to the seventh embodiment of the invention.
Figure 30:
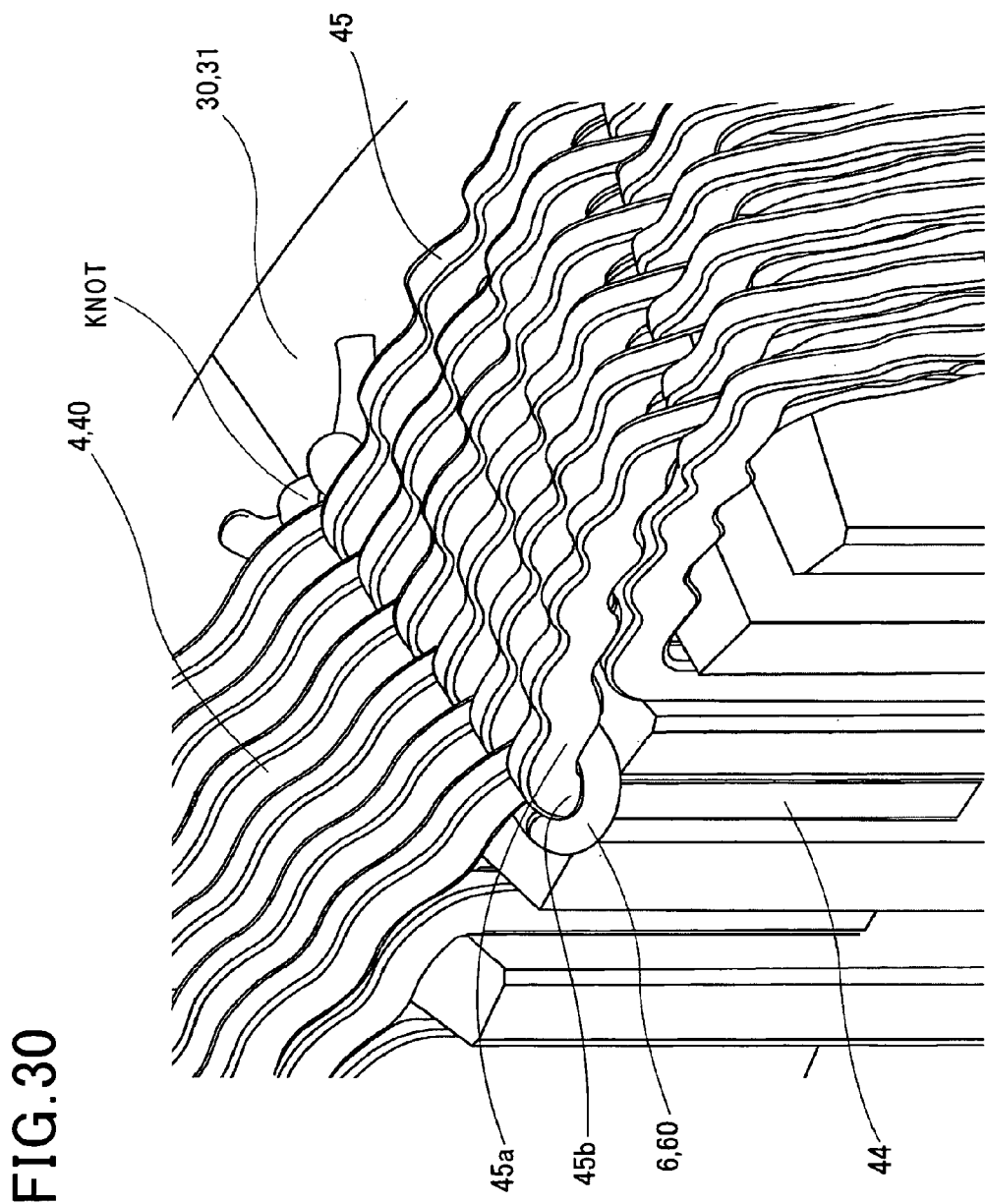
FIG. 30 is a schematic perspective view illustrating the restraint according to the seventh embodiment after being mounted to the turn portions of the corresponding turn portion group of the electric wires.

More specifically, as shown in FIGS. 29 and 30, in the present embodiment, each of the restraints 6 is implemented by a tie 60 that binds the end parts 45b of the turn portions 45 of the corresponding turn portion group together.

The tie 60 is made of, for example, an electrically-insulative resin and flexible. The tie 60 has a thickness that is substantially equal to the axial distance between the corresponding axial end face of the stator core 30 and those shoulder parts 45a of the turn portions 45 of the corresponding turn portion group which are adjacent to the end parts 45b. In addition, in the present embodiment, the tie 60 is knotted as shown in FIGS. 29 and 30.

With the tie 60 according to the present embodiment, it is possible to restrain both relative radial and relative circumferential movements between the turn portions 45 of the corresponding turn portion group.

Further, in the present embodiment, the tie 60 applies a compressive pressure to the end parts 45b of the turn portions 45 of the corresponding turn portion group of the electric wires 40, thereby more reliably restraining both relative radial and relative circumferential movements between the turn portions 45 of the corresponding turn portion group. Moreover, under the compressive pressure applied by the tie 60, the electric wires 40 can be more densely arranged, thereby improving the magnetic properties of the stator coil 4.

In addition, it is possible to bind the end parts 45b of the turn portions 45 of the corresponding turn portion group with the tie 60 using an existing binding machine designed for manufacture of electric motors. As a result, the manufacturing cost of the stator 3 can be reduced.

Eighth Embodiment

Figure 31:
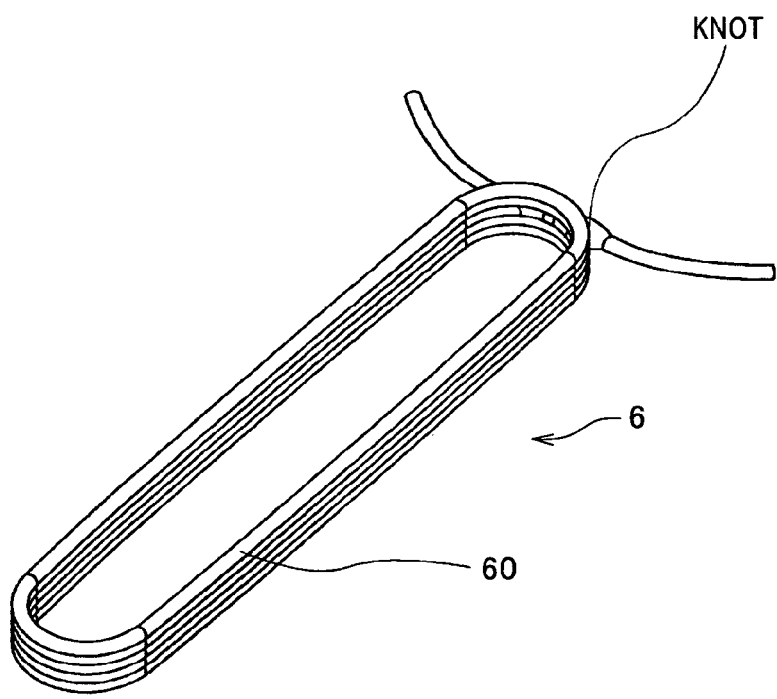
FIG. 31 is a perspective view of a restraint according to the eighth embodiment of the invention.
Figure 32:
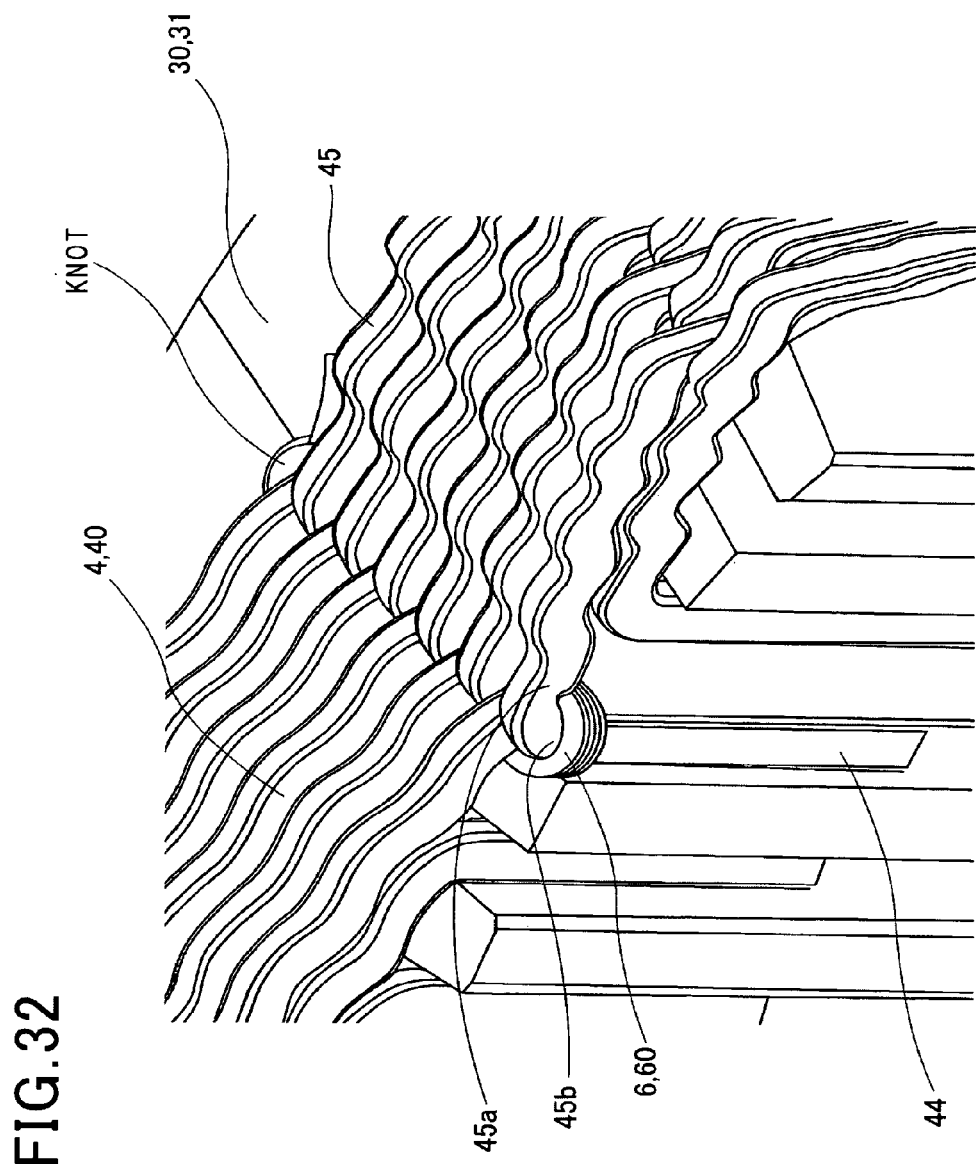
FIG. 32 is a schematic perspective view illustrating the restraint according to the eighth embodiment after being mounted to the turn portions of the corresponding turn portion group of the electric wires.

In this embodiment, each of the restraints 6 is implemented by a tie 60 as shown in FIGS. 31 and 32.

More specifically, in the present embodiment, the tie 60 is wound by a predetermined number of turns (e.g., 5 turns) around the end parts 45b of the turn portions 45 of the corresponding turn portion group. The tie 60 is made of an electrically-insulative resin and flexible as in the seventh embodiment. However, the tie 60 has a much smaller thickness than that in the seventh embodiment. For example, the tie 60 has a thickness equal to one fifth of that of the tine 60 in the seventh embodiment. In addition, in the present embodiment, the tie 60 is knotted as shown in FIGS. 31 and 32.

With the tie 60 according to the present embodiment, it is possible to achieve the same advantages as achievable with the tie 60 according to the seventh embodiment.

Modifications of the Seventh and Eighth Embodiments

In the seventh and eighth embodiments, the ties 60 are knotted to bind the end parts 45b of the turn portions 45 of the corresponding turn portion groups together. However, the ties 60 may also be welded or bonded instead of being knotted. Otherwise, the ties 60 may also be implemented by cable ties each having a rack at one end and a ratchet at the other end.

Figure 33:
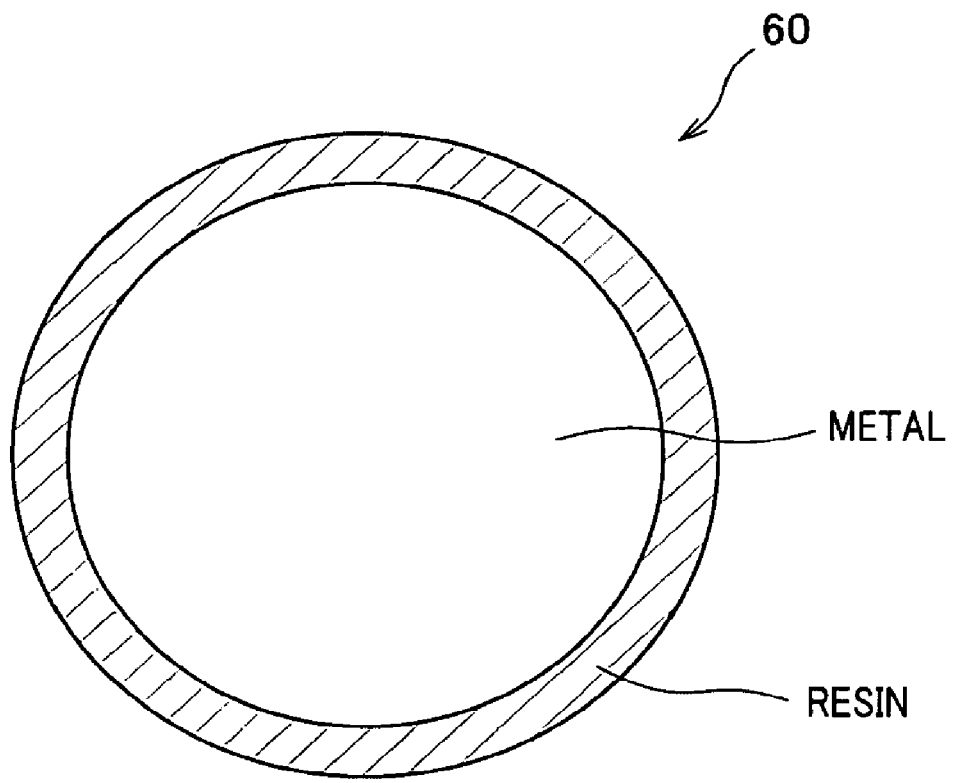
FIG. 33 is a cross-sectional view illustrating a modification of the seventh and eighth embodiments.

Furthermore, in the seventh and eighth embodiments, the ties 60 are made of an elastically-insulative resin. However, the ties 60 may also be made of other materials. For example, as shown in FIG. 33, each of the ties 60 may be made of a metal, which forms a core of the tie 60, and an electrically-insulative resin that forms an insulating coat to cover the core. In this case, it is possible to enhance mechanical strength of the ties 60 while ensuring insulation properties of the stator 3.

While the above particular embodiments of the invention and modifications thereof have been shown and described, it will be understood by those skilled in the art that various further modifications, changes, and improvements may be made without departing from the spirit of the invention.

For example, it is possible to fix the restraints 5 or 6 described in the first to eighth embodiments of the invention to either or both of the stator core 30 and the stator coil 4. When the restraints 5 or 6 are fixed to the stator coil 4, it is possible to prevent the stator coil 4 from making contact with the stator core 30 during operation of the electric rotating machine 1. Moreover, when the restraints 5 or 6 are fixed to the stator core 30, it is possible to restrain relative movement between the restraints 5 or 6 and the stator core 30. In addition, the restraints 5 or 6 may be fixed to the stator core 30 and the stator coil 4 by, for example, adhesive bonding.

What is claimed is:

1. A stator for an electric rotating machine, the stator comprising:
    a hollow cylindrical stator core having a plurality of slots that are formed in a radially inner surface of the stator core and spaced at predetermined intervals in a circumferential direction of the stator core;
    a stator coil comprised of a plurality of electric wires mounted on the stator core, each of the electric wires having a plurality of in-slot portions, each of which is received in a corresponding one of the slots of the stator core, and a plurality of turn portions each of which is located outside of the slots of the stator core to connect one adjacent pair of the in-slot portions of the electric wire; and
    at least one restraint that is mounted to end parts of the turn portions belonging to a turn portion group of the electric wires to restrain relative radial movement between the turn portions of the turn portion group, all of the turn portions of the turn portion group protruding from the same one of the slots of the stator core, the end parts of the turn portions of the turn portion group respectively adjoining the in-slot portions of the electric wires received in the same slot of the stator core and aligning with each other in a radial direction of the stator core.

2. The stator as set forth in claim 1, wherein the restraint includes first and second restraining portions and a connecting portion,
    the first restraining portion is located radially inside of and in abutment with the end part of the radially-inmost turn portion in the turn portion group of the electric wires,
    the second restraining portion is located radially outside of and in abutment with the end part of the radially-outmost turn portion in the turn portion group, and
    the connecting portion extends radially to connect the first and second restraining portions.

3. The stator as set forth in claim 2, wherein the end parts of the turn portions of the turn portion group of the electric wires are restrained between the first and second restraining portions of the restraint under a compressive pressure applied by the first and second restraining portions in the radial direction of the stator core.

4. The stator as set forth in claim 2, wherein each of the first and second restraining portions of the restraint is substantially L-shaped to include a base part and a tip part,
    the base part of the first restraining portion is connected to a radially inner end of the connecting portion and extends perpendicular to the connecting portion,
    the tip part of the first restraining portion extends radially outward from the base part of the first restraining portion so as to interpose the end part of the radially-inmost turn portion in the turn portion group of the electric wires between itself and the connecting portion,
    the base part of the second restraining portion is connected to a radially outer end of the connecting portion and extends perpendicular to the connecting portion, and
    the tip part of the second restraining portion extends radially inward from the base part of the second restraining portion so as to interpose the end part of the radially-inmost turn portion in the turn portion group of the electric wires between itself and the connecting portion.

5. The stator as set forth in claim 4, wherein the tip part of the second restraining portion of the restraint is tapered radially inward with one side surface thereof on the opposite side to the connecting portion of the restraint extending obliquely with respect to the connecting portion.

6. The stator as set forth in claim 2, wherein the stator core has a plurality of tooth portions each of which is formed to radially extend between one circumferentially-adjacent pair of the slots of the stator core, and
    the connecting portion has a width equal to the width of the tooth portions of the stator core at the radially inner periphery of the stator core.

7. The stator as set forth in claim 1, wherein the stator coil is formed by first stacking the electric wires to form a flat band-shaped electric wire assembly and then rolling the electric wire assembly by a predetermined number of turns into a hollow cylindrical shape.

8. The stator as set forth in claim 1, wherein the stator comprises a plurality of restraints each of which is mounted to end parts of the turn portions of a corresponding turn portion group of the electric wires to restrain relative radial movement between the turn portions of the corresponding turn portion group, all of the turn portions of the corresponding turn portion group protruding from the same one of the slots of the stator core, the end parts of the turn portions of the corresponding turn portion group respectively adjoining the in-slot portions of the electric wires received in the same one of the slots of the stator core.

9. The stator as set forth in claim 1, wherein the restraint has a protrusion that is formed on a contact surface of the restraint which contacts with a corresponding axial end face of the stator core, and
the protrusion is fitted into a recess that is formed in the corresponding axial end face of the stator core.

10. The stator as set forth in claim 9, wherein the restraint includes first and second restraining portions and a connecting portion,
the first restraining portion is located radially inside of and in abutment with the end part of the radially-inmost turn portion in the turn portion group of the electric wires,
the second restraining portion is located radially outside of and in abutment with the end part of the radially-outmost turn portion in the turn portion group,
the connecting portion extends radially to connect the first and second restraining portions, and
the protrusion is formed on the contact surface of the restraint so as to be located radially outside of the end part of the radially-outmost turn portion in the turn portion group of the electric wires.

11. The stator as set forth in claim 1, wherein the restraint includes a pair of connecting portions, a first restraining portion, and a pair of second restraining portions that are connected to the first restraining portion respectively by the connecting portions,
the first restraining portion extends perpendicular to the radial direction of the stator core and is located radially inside of and in abutment with the end part of the radially-inmost turn portion in the turn portion group of the electric wires,
the connecting portions extend, respectively from opposite ends of the first restraining portion, radially outward,
the second restraining portions extend, respectively from radially outer ends of the connecting portions, perpendicular to the connecting portions and toward each other, and
the second restraining portions are located radially outside of and in abutment with the end part of the radially-outmost turn portion in the turn portion group of the electric wires.

12. The stator as set forth in claim 11, wherein the interval between the connecting portions is substantially equal to the width of the electric wires.

13. The stator as set forth in claim 11, wherein the second restraining portions are tapered toward each other with their radially outer side surfaces extending obliquely with respect to the connecting portions.

14. The stator as set forth in claim 1, wherein the restraint includes a pair of connecting portions, a first restraining portion, and a pair of second restraining portions that are connected to the first restraining portion respectively by the connecting portions,
the first restraining portion extends perpendicular to the radial direction of the stator core and is located radially inside of the end part of the radially-inmost turn portion in the turn portion group of the electric wires,
the connecting portions extend, respectively from opposite ends of the first restraining portion, radially outward, and
the second restraining portions extend, respectively from radially outer ends of the connecting portions, perpendicular to major surfaces of the connecting portions and toward the same side, and
the second restraining protons are located radially outside of the end part of the radially-outmost turn portion in the turn portion group of the electric wires.

15. The stator as set forth in claim 14, wherein the second restraining portions are tapered with their radially outer side surfaces extending obliquely with respect to the connecting portions.

16. The stator as set forth in claim 14, wherein each of the connecting portions has a cut formed in a distal end surface thereof.

17. The stator as set forth in claim 1, wherein the restraint is comprised of a pair of first and second restraint pieces,
the first restraint piece has a substantially U-shape to include a first retraining portion and a pair of first connecting portions,
the first restraining portion extends perpendicular to the radial direction of the stator core and is located radially inside of and in abutment with the end part of the radially-inmost turn portion in the turn portion group of the electric wires,
the first connecting portions extend, respectively from opposite ends of the first restraining portion, radially outward,
the second restraint piece has a substantially U-shape to include a second retraining portion and a pair of second connecting portions,
the second restraining portion extends perpendicular to the radial direction of the stator core and is located radially outside of and in abutment with the end part of the radially-outmost turn portion in the turn portion group of the electric wires,
the second connecting portions extend, respectively from opposite ends of the second restraining portion, radially inward, and
the first and second restraint pieces overlap each other in an axial direction of the stator core.

18. The stator as set forth in claim 17, wherein both the intervals between the first connecting portions and between the second connecting portions are substantially equal to the width of the electric wires.

19. The stator as set forth in claim 17, wherein the first connecting portions respectively face the second connecting portions in the axial direction of the stator core,
each of the first and second connecting portions has tooth formed on a surface thereof, and
for each facing pair of the first and second connecting portions, the tooth of the first connecting portion mesh with the tooth of the second connecting portion, thereby fixing the first and second restraint pieces together.

20. The stator as set forth in claim 1, wherein the stator further comprises at least one second restraint that is interposed between the turn portions of the turn portion group of the electric wires and an axial end face of the stator core to restrain relative movement between the turn portions of the turn portion group and the stator core.

21. The stator as set forth in claim 20, wherein the restraint and the second restraint are integrated into a single restraining device.

22. The stator as set forth in claim 21, wherein the stator core is comprised of a plurality of stator core segments that are arranged in the circumferential direction of the stator core to adjoin one another, and
the restraining device extends in the circumferential direction of the stator core across the boundary between an adjacent pair of the stator core segments of the stator core.

23. The stator as set forth in claim 1, wherein the restraint is made up of a tie that binds the end parts of the turn portions of the turn portion group of the electric wires together.

24. The stator as set forth in claim 23, wherein the tie applies a compressive pressure to the end parts of the turn portions of the turn portion group of the electric wires.

25. The stator as set forth in claim 23, wherein the tie is wound around the end parts of the turn portions of the turn portion group of the electric wires by a predetermined number of turns.

26. The stator as set forth in claim 1, wherein the restraint is made of an electrically-insulative resin.

27. The stator as set forth in claim 1, wherein the restraint is made of a metal, which forms a core of the restraint, and an electrically-insulative resin that forms an insulating coat covering the core.

28. The stator as set forth in claim 1, wherein the restraint is fixed to the stator coil.

29. The stator as set forth in claim 1, wherein the restraint is fixed to the stator core.

30. The stator as set forth in claim 1, wherein each of the turn portions of the electric wires is stepped to include a plurality of shoulder parts that extend parallel to a corresponding axial end face of the stator core from which the turn portion protrudes, and each of the end parts of the turn portions of the turn portion group extends between a corresponding one of the in-slot portions of the electric wires connected by the turn portion and a corresponding one of the shoulder parts of the turn portion which is closest to the corresponding axial end face of the stator core among the shoulder parts of the turn portion.

31. An electric rotating machine comprising a rotating shaft, a rotor fixed on the rotating shaft, and a stator surrounding the rotor, wherein the stator comprises:

a hollow cylindrical stator core having a plurality of slots that are formed in a radially inner surface of the stator core and spaced at predetermined intervals in a circumferential direction of the stator core;

a stator coil comprised of a plurality of electric wires mounted on the stator core, each of the electric wires having a plurality of in-slot portions, each of which is received in a corresponding one of the slots of the stator core, and a plurality of turn portions each of which is located outside of the slots of the stator core to connect one adjacent pair of the in-slot portions of the electric wire; and at least one restraint that is mounted to end parts of the turn portions belonging to a turn portion group of the electric wires to restrain relative radial movement between the turn portions of the turn portion group, all of the turn portions of the turn portion group protruding from the same one of the slots of the stator core, the end parts of the turn portions of the turn portion group respectively adjoining the in-slot portions of the electric wires received in the same slot of the stator core and aligning with each other in a radial direction of the stator core.

* * * * *